US009653214B2

United States Patent
Hattori et al.

(10) Patent No.: US 9,653,214 B2
(45) Date of Patent: May 16, 2017

(54) LAMINATED CAPACITOR AND LAMINATED CAPACITOR SERIES AND LAMINATED CAPACITOR MOUNTED BODY INCLUDING CAPACITOR

(71) Applicant: Murata Manufacturing Co., Ltd., Nagaokakyo-shi, Kyoto-fu (JP)

(72) Inventors: Kazuo Hattori, Nagaokakyo (JP); Isamu Fujimoto, Nagaokakyo (JP); Hirobumi Adachi, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 40 days.

(21) Appl. No.: 14/729,239

(22) Filed: Jun. 3, 2015

(65) Prior Publication Data

US 2015/0364258 A1 Dec. 17, 2015

(30) Foreign Application Priority Data

Jun. 12, 2014 (JP) ................... 2014-121606

(51) Int. Cl.
*H01G 4/30* (2006.01)
*H01G 4/012* (2006.01)
*H01G 4/12* (2006.01)

(52) U.S. Cl.
CPC ............... *H01G 4/30* (2013.01); *H01G 4/012* (2013.01); *H01G 4/12* (2013.01)

(58) Field of Classification Search
CPC ............. H01G 4/30; H01G 4/12; H01G 4/012
See application file for complete search history.

(56) References Cited

U.S. PATENT DOCUMENTS

| 7,307,829 B1* | 12/2007 | Devoe | H01G 2/065 361/303 |
| 7,576,968 B2† | 8/2009 | Ritter | |
| 8,125,765 B2† | 2/2012 | Ishida | |
| 8,446,705 B2† | 5/2013 | Ritter | |
| 2003/0026059 A1* | 2/2003 | Togashi | H01G 4/005 361/303 |
| 2006/0215350 A1 | 9/2006 | Tonogai et al. | |
| 2007/0025054 A1* | 2/2007 | Tonogai | H01G 4/30 361/303 |

(Continued)

FOREIGN PATENT DOCUMENTS

| JP | 2004-342846 A | 12/2004 |
| JP | 2006-278556 A | 10/2006 |

(Continued)

OTHER PUBLICATIONS

Official Communication issued in corresponding Japanese Patent Application No. 2014-121606, mailed on Oct. 4, 2016.

*Primary Examiner* — David M Sinclair
(74) *Attorney, Agent, or Firm* — Keating & Bennett, LLP

(57) ABSTRACT

In a laminated capacitor, a distance between an inner internal electrode at a first principal surface side, from a pair of internal electrodes that sandwich an effective dielectric layer located closest to a second principal surface side in a first sub-electrostatic capacitance portion, and a second principal surface is smaller than or equal to a distance between an internal electrode located closest to the second principal surface side in a main electrostatic capacitance portion and the inner internal electrode.

13 Claims, 14 Drawing Sheets

(56) References Cited

U.S. PATENT DOCUMENTS

| | | | |
|---|---|---|---|
| 2011/0122540 A1* | 5/2011 | Ogawa | H01G 4/2325 |
| | | | 361/305 |
| 2011/0149466 A1* | 6/2011 | Hwang | H01G 4/012 |
| | | | 361/303 |
| 2012/0262837 A1 | 10/2012 | Hoshi et al. | |
| 2013/0056252 A1 | 3/2013 | Fujii et al. | |
| 2013/0319742 A1 | 12/2013 | Ahn et al. | |
| 2013/0341082 A1* | 12/2013 | Kuroda | H01C 7/008 |
| | | | 174/527 |
| 2014/0043723 A1 | 2/2014 | Hattori et al. | |
| 2014/0126106 A1 | 5/2014 | Sawada | |
| 2014/0131082 A1* | 5/2014 | Ahn | H05K 3/3442 |
| | | | 174/260 |
| 2014/0133064 A1 | 5/2014 | Ahn et al. | |
| 2014/0290998 A1* | 10/2014 | Ahn | H01G 4/30 |
| | | | 174/260 |

FOREIGN PATENT DOCUMENTS

| | | |
|---|---|---|
| JP | 2014-042743 A | 2/2007 |
| JP | 2013-065820 A | 4/2013 |
| JP | 2013-251523 A | 12/2013 |
| JP | 2014-096555 A | 5/2014 |
| KR | 10-2013-0103464 A | 9/2013 |
| KR | 10-2014-0020774 A | 2/2014 |
| KR | 10-2014-0058371 A | 5/2014 |

\* cited by examiner
† cited by third party

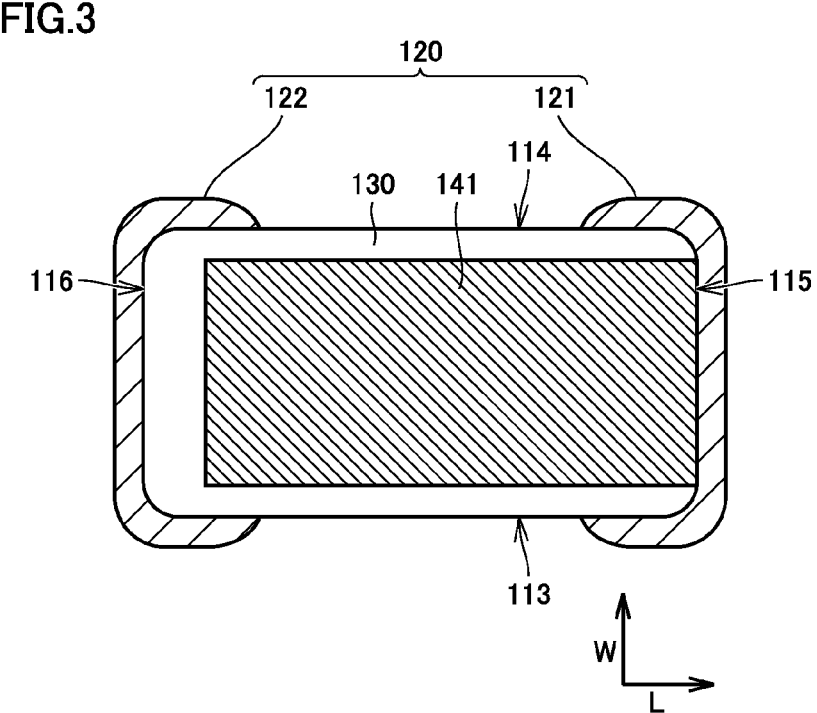
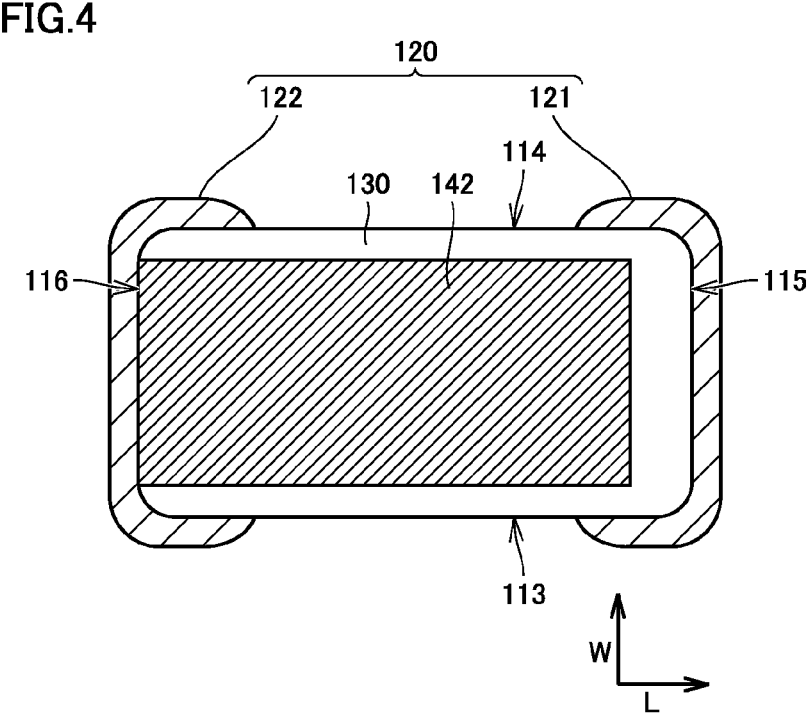

LAMINATED CAPACITOR AND LAMINATED CAPACITOR SERIES AND LAMINATED CAPACITOR MOUNTED BODY INCLUDING CAPACITOR

BACKGROUND OF THE INVENTION

1. Field of the Invention

The present invention relates to a laminated capacitor, and a laminated capacitor series and a laminated capacitor mounted body including the capacitor.

2. Description of the Related Art

Prior art documents that disclose laminated capacitor mounted structures for the reduction of noise referred to as "acoustic noise" include Japanese Patent Laying-Open No. 2013-65820. In the laminated capacitor mounted structure described in Japanese Patent Laying-Open No. 2013-65820, lands are provided on a substrate body, and respectively connected to external electrodes with solder. The height from the land electrode to the solder top is less than or equal to 1.27 times the height from the land electrode to apart of a capacitor conductor located closest to a circuit substrate, which is exposed from an end surface.

Prior art documents that disclose laminated ceramic capacitors for the reduction of ESL (Equivalent Series Inductance) include Japanese Patent Laying-Open No. 2004-342846. The laminated ceramic capacitor described in Japanese Patent Laying-Open No. 2004-342846 is provided with terminal electrodes on both end surfaces in a longitudinal direction of a ceramic base. Electrode films are buried in the ceramic base, and stacked with ceramic layers interposed therebetween in the thickness direction of the ceramic base. One of the adjacent electrode films has one end connected to one of the terminal electrodes, whereas the other of the adjacent electrode films has one end connected to the other of the terminal electrodes. The conditions of: $d1<e\leq400$ μm; and $0<d1\leq80$ μm are satisfied when the distance from the bottom to the uppermost electrode film is denoted by e in the thickness direction of the ceramic base, whereas the distance from the bottom to the lowermost electrode film is denoted by d1.

There is room for improvement of the laminated capacitor mounted structure described in Japanese Patent Laying-Open No. 2013-65820 from the perspective of reducing equivalent series inductance (ESL). There is room for improvement of the laminated ceramic capacitor described in Japanese Patent Laying-Open No. 2004-342846 from the perspective of reducing acoustic noise.

SUMMARY OF THE INVENTION

Preferred embodiments of the present invention provide a laminated capacitor that further reduces or prevents acoustic noise while suppressing ESL, and a laminated capacitor series and a laminated capacitor mounted body including the capacitor.

A laminated capacitor in accordance with a first aspect of various preferred embodiments of the present invention includes a laminated body including dielectric layers and internal electrodes stacked in a stacking direction, and including a first principal surface and a second principal surface located opposite to each other in the stacking direction; and a plurality of external electrodes provided partially on a surface of the laminated body and electrically connected to the internal electrodes; wherein the laminated body includes a main electrostatic capacitance portion including an effective dielectric layer sandwiched between a pair of the internal electrodes connected to different ones of the external electrodes, and stacked with the pair of the internal electrodes; and a first sub-electrostatic capacitance portion sandwiched between the main electrostatic capacitance portion and the second principal surface; the first sub-electrostatic capacitance portion includes a plurality of ineffective dielectric layers each sandwiched between another pair of the internal electrodes connected to the same external electrode, at least one effective dielectric layer, and a plurality of the internal electrodes sandwiching each of the effective dielectric layers; and one of the plurality of ineffective dielectric layers among the plurality of ineffective dielectric layers is adjacent to the main electrostatic capacitance portion.

According to a preferred embodiment of the present invention, the number of the effective dielectric layers included in the main electrostatic capacitance portion is larger than the number of the effective dielectric layers included in the first sub-electrostatic capacitance portion. The main electrostatic capacitance portion is thicker than the first sub-electrostatic capacitance portion.

According to a preferred embodiment of the present invention, when internal electrodes adjacent to, at the second principal surface side and the first principal surface side, the effective dielectric layer closest to the second principal surface in the first sub-electrostatic capacitance portion are respectively defined as an outer internal electrode and an inner internal electrode, a distance between the inner internal electrode and the second principal surface is smaller than or equal to a distance between the internal electrode closest to the second principal surface in the main electrostatic capacitance portion and the inner internal electrode.

According to a preferred embodiment of the present invention, when the internal electrodes adjacent to, at the second principal surface side and the first principal surface side, the effective dielectric layer closest to the second principal surface in the first sub-electrostatic capacitance portion are respectively defined as an outer internal electrode and an inner internal electrode, the shortest distance between the external electrode connected to the inner internal electrode and the outer internal electrode is larger than the shortest distance between the outer internal electrode and the inner internal electrode.

According to a preferred embodiment of the present invention, the main electrostatic capacitance portion has a center located farther away from the second principal surface than a center of the laminated body in the stacking direction.

According to a preferred embodiment of the present invention, the laminated body further includes a first end surface and a second end surface opposed to each other and connecting the first principal surface and the second principal surface, and a first side surface and a second side surface opposed to each other and connecting the first principal surface and the second principal surface and connect the first end surface and the second end surface. The shortest distance between the first side surface and the second side surface is less than the shortest distance between the first end surface and the second end surface. One of the pair of internal electrodes is connected at the first end surface to one of the plurality of external electrode. The other of the pair of internal electrodes is connected at the second end surface to the other of the plurality of external electrodes.

According to a preferred embodiment of the present invention, the laminated body further includes a first end surface and a second end surface opposed to each other and connecting the first principal surface and the second principal surface, and a first side surface and a second side surface opposed to each other and connecting the first principal surface and the second principal surface and connect the first end surface and the second end surface. The shortest distance between the first side surface and the second side surface is less than the shortest distance between the first end surface and the second end surface. One of the pair of internal electrodes is connected at the first side surface to one of the plurality of external electrode. The other of the pair of internal electrodes is connected at the second side surface to the other of the plurality of external electrodes.

According to a preferred embodiment of the present invention, the ineffective dielectric layer adjacent to the main electrostatic capacitance portion is thicker than the effective dielectric layer of the main electrostatic capacitance portion.

According to a preferred embodiment of the present invention, an electrostatic capacitance for each of the effective dielectric layers included in the first sub-electrostatic capacitance portion is lower than an electrostatic capacitance for each of the effective dielectric layers included in the main electrostatic capacitance portion.

According to a preferred embodiment of the present invention, the laminated body further includes an internal conductor located between the internal electrode adjacent to, at the first principal surface side, the effective dielectric layer located closest to the first principal surface and the first principal surface.

According to a preferred embodiment of the present invention, the first sub-electrostatic capacitance portion is a strain suppression portion that suppresses strain in the laminated body, with one ineffective dielectric layer located between the effective dielectric layer of the first sub-electrostatic capacitance portion and the main electrostatic capacitance portion.

According to a preferred embodiment of the present invention, the laminated body further includes a second sub-electrostatic capacitance portion sandwiched between the main electrostatic capacitance portion and the first principal surface. The second sub-electrostatic capacitance portion includes a plurality of the other ineffective dielectric layers each sandwiched between a pair of internal electrodes connected to the same external electrode, and at least one effective dielectric layer. One of the other ineffective dielectric layers among the plurality of the other ineffective dielectric layers is adjacent to the main electrostatic capacitance portion.

According to a preferred embodiment of the present invention, the number of the effective dielectric layers included in the main electrostatic capacitance portion is larger than the number of the effective dielectric layers included in the second sub-electrostatic capacitance portion. The main electrostatic capacitance portion is thicker than the second sub-electrostatic capacitance portion.

According to a preferred embodiment of the present invention, when internal electrodes adjacent to, at the first principal surface side and the second principal surface side, the effective dielectric layer closest to the first principal surface in the second sub-electrostatic capacitance portion are respectively defined as other outer internal electrode and other inner internal electrode, a distance between the other inner internal electrode and the first principal surface is smaller than or equal to a distance between the internal electrode closest to the first principal surface in the main electrostatic capacitance portion and the other inner internal electrode.

According to a preferred embodiment of the present invention, when the internal electrodes adjacent to, at the first principal surface side and the second principal surface side, the effective dielectric layer closest to the first principal surface in the second sub-electrostatic capacitance portion are respectively defined as other outer internal electrode and other inner internal electrode, the shortest distance between the external electrode connected to the other inner internal electrode and the other outer internal electrode is larger than the shortest distance between the other outer internal electrode and the other inner internal electrode.

According to a preferred embodiment of the present invention, an electrostatic capacitance for each of the effective dielectric layers included in the second sub-electrostatic capacitance portion is lower than an electrostatic capacitance for each of the effective dielectric layers included in the main electrostatic capacitance portion.

According to a preferred embodiment of the present invention, the laminated body further includes an internal conductor located between the internal electrode adjacent to, at the second principal surface side, the effective dielectric layer located closest to the second principal surface and the second principal surface.

According to a preferred embodiment of the present invention, the second sub-electrostatic capacitance portion is a strain suppression portion that suppresses strain in the laminated body, with one other ineffective dielectric layer located between the effective dielectric layer of the second sub-electrostatic capacitance portion and the main electrostatic capacitance portion.

A laminated capacitor series in accordance with a second aspect of various preferred embodiments of the present invention includes the plurality of laminated capacitors according to any of the foregoing preferred embodiments of the present invention; and a packing body including an elongated carrier tape provided with a plurality of recesses at intervals for respectively housing the plurality of laminated capacitors, and a cover tape attached to the carrier tape to seal the plurality of recesses. The plurality of laminated capacitors are respectively housed in the plurality of recesses, with the second principal surfaces located at the bottom sides of the plurality of recesses.

A laminated capacitor mounted body in accordance with a third aspect of various preferred embodiments of the present invention includes the laminated capacitor according to any of the foregoing preferred embodiments of the present invention, and a mounting body mounted with the laminated capacitor. The second principal surface of the laminated capacitor is opposed to the mounting body.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a cross-sectional view of the laminated capacitor in FIG. 2, as viewed from a direction of arrows along the line III-III.

FIG. 4 is a cross-sectional view of the laminated capacitor in FIG. 2, as viewed from a direction of arrows along the line IV-IV.

DETAILED DESCRIPTION OF THE PREFERRED EMBODIMENTS

Laminated capacitors, and laminated capacitor series and laminated capacitor mounted bodies including the capacitors according to respective preferred embodiments of the present invention will be described below with reference to the drawings. In the following descriptions of the preferred embodiments, the same or corresponding elements or features in the figures are denoted by the same symbols, and the descriptions of the parts will not be repeated.

Preferred Embodiment 1

Figure 1:
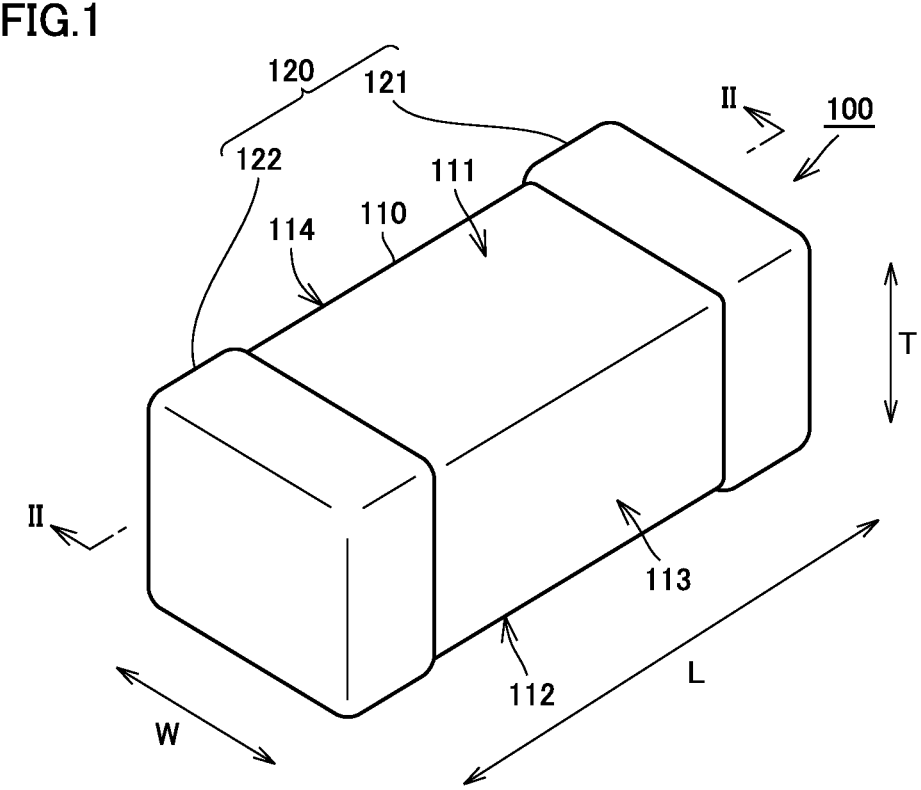
FIG. 1 is a perspective view illustrating the appearance of a laminated capacitor according to Preferred Embodiment 1 of the present invention.

With reference to FIGS. 1 to 5, a laminated capacitor according to Preferred Embodiment 1 of the present invention will be described. FIG. 1 illustrates therein a longitudinal direction L of a laminated body, a width direction W of the laminated body, and a thickness direction T of the laminated body as described later.

As shown in FIGS. 1 to 5, a laminated capacitor 100 according to Preferred Embodiment 1 of the present invention includes a laminated body 110 that includes dielectric layers 130 and internal electrodes 140 alternately stacked, and includes a first principal surface 111 and a second principal surface 112 located on the sides opposite to each other, and a plurality of external electrodes 120 provided partially on the surface of laminated body 110, and electrically connected to internal electrodes 140.

The stacking direction of dielectric layers 130 and internal electrodes 140 is orthogonal to a length direction L of laminated body 110 and a width direction W of laminated body 110. More specifically, the stacking direction of dielectric layers 130 and internal electrodes 140 is parallel to a thickness direction T of laminated body 110.

Laminated body 110 further includes a first end surface 115 and a second end surface 116 opposed to each other and connecting first principal surface 111 and second principal surface 112, and a first side surface 113 and a second side surface 114 opposed to each other and connecting first principal surface 111 and second principal surface 112, as well as connecting first end surface 115 and second end surface 116. The shortest distance between first side surface 113 and second side surface 114 is less than the shortest distance between first end surface 115 and second end surface 116. More specifically, the dimension in the width direction W of laminated body 110 is smaller than the dimension in the longitudinal direction L of laminated body 110.

In order to configure a laminated capacitor mounted structure with first principal surface 111 or second principal surface 112 opposed to a mounting body 1 as described later, the dimension in the width direction W of laminated body 110 preferably differs by greater than or equal to about 20% from the dimension in the thickness direction T thereof to distinguish the principal surfaces and the side surfaces. In this case, for small-size laminated capacitor 100 of less than about 0.8 mm in dimension in the width direction W of laminated body 110, the dimension in the height direction T of laminated body 110 is preferably larger than the dimension in the width direction W thereof in order to ensure both electrostatic capacitance and the thickness of a first sub-electrostatic capacitance portion as described later. On the other hand, for large-size laminated capacitor 100 of greater than or equal to about 0.8 mm in dimension in the width direction W of laminated body 110, the dimension in the height direction T of laminated body 110 is preferably smaller than the dimension in the width direction W thereof in order to reduce the height of a laminated capacitor mounted structure. Laminated body 110 preferably has a rectangular or substantially rectangular parallelepiped outer shape, but may include corners and ridges at least one of which is rounded.

In the present preferred embodiment, external electrodes 120 are provided on both sides in the longitudinal direction L of laminated body 110. Specifically, external electrodes 120 include a first external electrode 121 provided on first end surface 115 side in the longitudinal direction L of laminated body 110; and a second external electrode 122 provided on second end surface 116 side in the longitudinal direction L of laminated body 110.

Pairs of internal electrodes 140 connected to external electrodes 120 that differ from each other include a plurality of first internal electrodes 141 electrically connected to first external electrode 121, and a plurality of second internal electrodes 142 electrically connected to second external electrode 122. First internal electrodes 141 and second internal electrodes 142 each preferably have a rectangular or substantially rectangular shape in planar view, and face each other with effective dielectric layers 133 interposed therebetween as described later.

In the present preferred embodiment, a plurality of first internal electrodes 141 and first external electrode 121 are connected at first end surface 115. A plurality of second internal electrodes 142 and second external electrode 122 are connected at second end surface 116.

Dielectric layers 130 include a first outer layer 131 that defines first principal surface 111, a second outer layer 132 that defines second principal surface 112, and effective dielectric layers 133 connected to external electrodes 120 that differ from each other, and sandwiched between pairs of internal electrodes 140.

Dielectric layers 130 further include ineffective dielectric layers 134 connected to the same external electrode 120 and sandwiched pairs of internal electrodes 140. Specifically, ineffective dielectric layers 134 are sandwiched between first internal electrodes 141 or between second internal electrodes 142. Laminated body 110 includes a main electrostatic capacitance portion 10 with effective dielectric layers 133 continuously and repeatedly stacked to provide main electrostatic capacitance, and a strain suppression portion 20 as a first sub-electrostatic capacitance portion sandwiched between main electrostatic capacitance portion 10 and second principal surface 112.

More specifically, in main electrostatic capacitance portion 10, a unit capacitor preferably including three layers defined by an effective dielectric layer 133; and a first internal electrode 141 and a second internal electrode 142 with the effective dielectric layer 133 interposed therebetween is continuously and repeatedly stacked. The main electrostatic capacitance refers to the highest electrostatic capacitance higher than half the total electrostatic capacitance of laminated capacitor 100.

Strain suppression portion 20 includes a plurality of ineffective dielectric layers 134 each sandwiched between a pair of internal electrodes 140 connected to the same external electrode 120, at least one effective dielectric layer 133, and first internal electrode 141 and second internal electrode 142 that mutually sandwich effective dielectric layer 133. One of ineffective dielectric layers 134 among the plurality of ineffective dielectric layers 134 is adjacent to main electrostatic capacitance portion 10. Specifically, one of ineffective dielectric layers 134 among the plurality of ineffective dielectric layers 134 is adjacent to main electrostatic capacitance portion 10 at second principal surface 112 side.

In the present preferred embodiment, effective dielectric layers 133 and ineffective dielectric layers 134 are alternately stacked one by one in strain suppression portion 20. More specifically, at least one effective dielectric layer 133 in strain suppression portion 20 is sandwiched between ineffective dielectric layers 134, whereas at least one ineffective dielectric layer 134 is sandwiched between effective dielectric layers 133. It is to be noted that in strain suppression portion 20, at least one of effective dielectric layer 133 and ineffective dielectric layer 134 may be continuously stacked twice, such as stacked, for example, in the order of effective dielectric layer 133, effective dielectric layer 133, ineffective dielectric layer 134, and ineffective dielectric layer 134.

Figure 5:
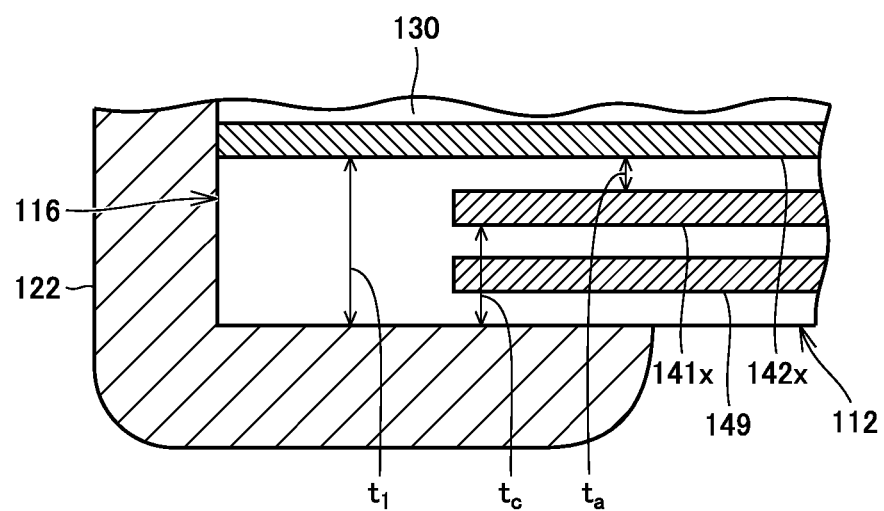
FIG. 5 is an enlarged cross-sectional view of an end on a second principal surface side of the laminated capacitor in FIG. 2.

In the present preferred embodiment, all of effective dielectric layers 133 and ineffective dielectric layers 134 included in laminated body 110 are uniform or substantially uniform in thickness $t_a$, as shown in FIG. 5.

Figure 2:
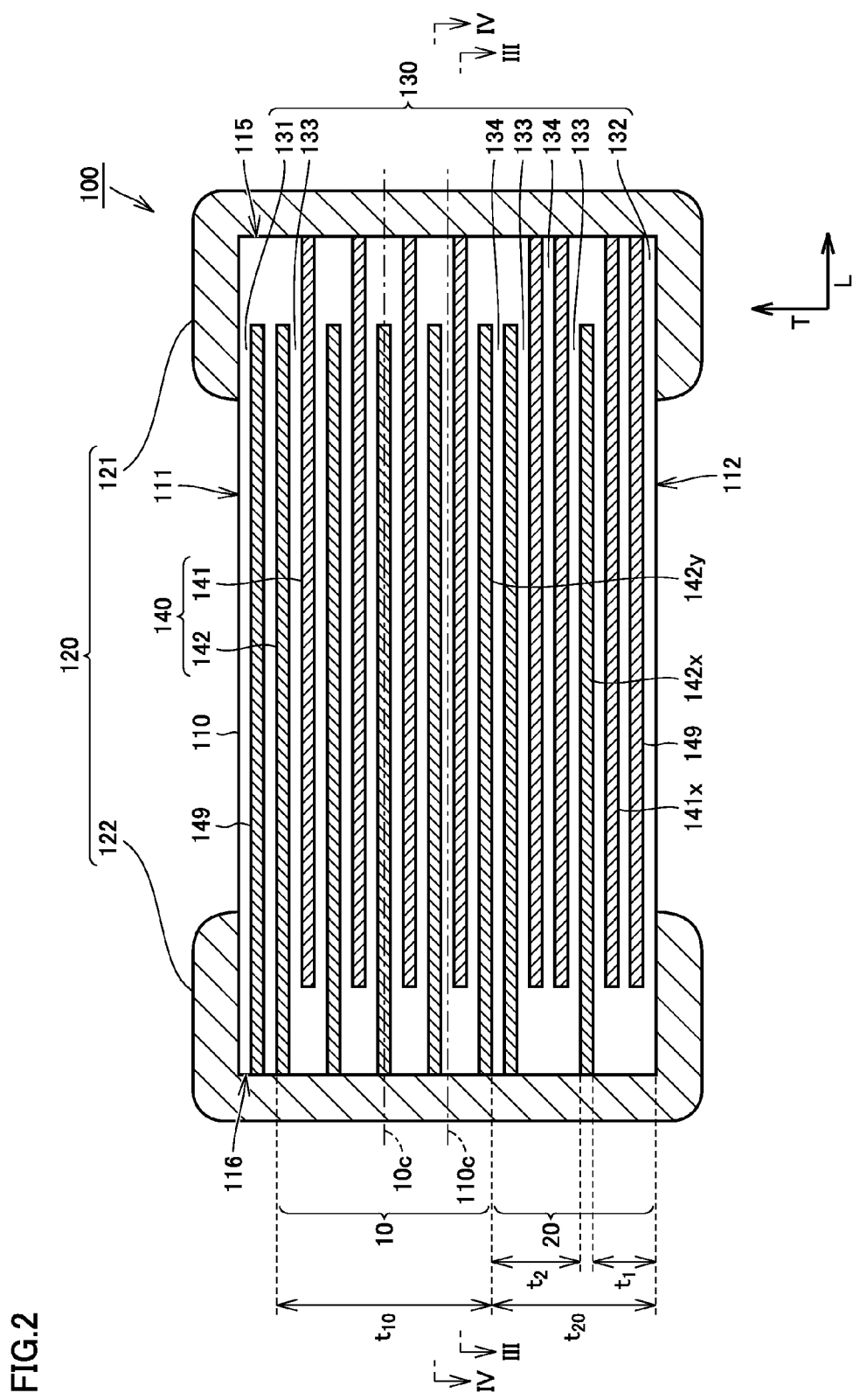
FIG. 2 is a cross-sectional view of the laminated capacitor in FIG. 1, as viewed from a direction of arrows along the line II-II.

The number of effective dielectric layers 133 included in main electrostatic capacitance portion 10 is larger than the number of effective dielectric layers 133 included in strain suppression portion 20. Main electrostatic capacitance portion 10 is thicker than strain suppression portion 20. More specifically, as shown in FIG. 2, the condition of $t_{10} > t_{20}$ is satisfied when the thickness of main electrostatic capacitance portion 10 is denoted by $t_{10}$, whereas the thickness of strain suppression portion 20 is denoted by $t_{20}$.

The distance $t_1$ between an inner internal electrode 142$x$ adjacent to, at first principal surface 111 side, effective dielectric layer 133 closest to second principal surface 112 in strain suppression portion 20 and second principal surface 112 is shorter than or equal to the distance $t_2$ between an internal electrode 142$y$ closest to second principal surface 112 in main electrostatic capacitance portion 10 and inner internal electrode 142$x$.

In the present preferred embodiment, a center 10$c$ of main electrostatic capacitance portion 10 is spaced farther away from second principal surface 112 than a center 110$c$ of laminated body 110 in the stacking direction mentioned above. More specifically, main electrostatic capacitance portion 10 is biased at first principal surface 111 side in the stacking direction of laminated body 110.

As shown in FIG. 5, the shortest distance $t_c$ between an outer internal electrode 141$x$ adjacent, at second principal surface 112 side, to effective dielectric layer 133 closest to second principal surface 112 in strain suppression portion 20 and second external electrode 122 connected to inner internal electrode 142$x$ is larger than the shortest distance $t_a$ between outer internal electrode 141$x$ and inner internal electrode 142$x$.

The respective constituents of laminated capacitor 100 will be described below in detail.

Dielectric ceramics containing $BaTiO_3$, $CaTiO_3$, $SrTiO_3$, $CaZrO_3$, or the like as its main constituent can be used as a material constituting dielectric layers 130. Dielectric ceramics of the main constituents with a Mn compound, a Mg compound, a Si compound, a Co compound, a Ni compound, or a rare-earth compound added thereto as an accessory constituent may be used as a material constituting dielectric layers 130.

Metals such as Ni, Cu, Ag, Pd, and Au, or alloys containing at least one of the metals, for example, an alloy of Ag and Pd can be used as a material of the internal electrodes 140. Internal electrodes 140 are each preferably greater than or equal to about 0.3 μm and less than or equal to about 2.0 μm in thickness after being subjected to firing, for example.

External electrodes 120 include a base layer provided to cover both ends of laminated body 110, and a plated layer provided to cover the base layer. Metals such as Ni, Cu, Ag, Pd, and Au, or alloys containing at least one of the metals, for example, an alloy of Ag and Pd can be used as a material of the base layer. The base layer is preferably greater than or equal to about 10.0 μm and less than or equal to about 50.0 μm in thickness, for example.

As the base layer, a conductive paste may be applied to both ends of laminated body 110, and baked, or subjected to firing at the same time as internal electrodes 140. Besides, as the base layer, both ends of laminated body 110 may be plated to form a base layer, or a conductive resin paste including a resin and metal particles may be applied to both ends of laminated body 110, and subjected to curing.

Metals such as Ni, Cu, Ag, Pd, and Au, or alloys containing at least one of the metals, for example, an alloy of Ag and Pd can be used as a material of the plated layer.

The plated layer may include multiple layers. In this case, the plated layer preferably has a two-layer structure of a Sn plated layer with favorable wettability to solder formed on a Ni plated layer that defines and functions as a solder barrier layer. The plated layers preferably are greater than or equal to about 1.0 μm and less than or equal to about 10.0 μm in thickness per layer, for example.

A non-limiting example of a method for manufacturing laminated capacitor 100 according to the present preferred embodiment will be described below.

First, a ceramic paste including a ceramic powder is applied into the form of a sheet by a screen printing method or the like, and dried to prepare ceramic green sheets.

For some of the ceramic green sheets prepared, a conductive paste for the formation of the internal electrodes is applied onto the ceramic green sheet by a screen printing method, a gravure printing, or the like, so as to provide a predetermined pattern. In this way, prepared are: ceramic green sheets with conductive patterns to define internal electrodes; and ceramic green sheets with no conductive pattern formed thereon. It is to be noted that the ceramic paste and the conductive paste for the formation of internal electrodes may include known binders and solvents.

A predetermined number of ceramic green sheets without any conductive pattern formed is stacked in order to form first outer layer 131, a plurality of ceramic green sheets with the conductive patterns formed is sequentially stacked thereon in order to form main electrostatic capacitance portion 10, a plurality of ceramic green sheets with the conductive patterns formed is sequentially formed thereon in order to form effective dielectric layers 133 and ineffective dielectric layers 134 of strain suppression portion 20, and a predetermined number of ceramic green sheets without any conductive pattern formed is stacked thereon in order to form second outer layer 132, thus preparing a mother laminated body. Thereafter, the mother laminated body is pressed in the stacking direction by isostatic pressing or other suitable method.

In this regard, when the ceramic green sheet with the conductive pattern formed to serve as first internal electrode 141 and the ceramic green sheet with the conductive pattern formed to serve as second internal electrode 142 are referred to respectively as an A pattern and a B pattern, stacking the A pattern and the B pattern provides the ceramic green sheet sandwiched between the respective conductive patterns to serve as effective dielectric layer 133.

On the other hand, stacking the A patterns or the B patterns on one another provides the ceramic green sheet sandwiched between the respective conductive patterns to serve as ineffective dielectric layer 134. Alternately stacking the A patterns and the B patterns in the order of A pattern, B pattern, A pattern, and B pattern forms main electrostatic capacitance portion 10 with effective dielectric layers 133 continuously and repeatedly stacked. On the other hand, repeatedly stacking two for each of the A pattern and B pattern in the order of A pattern, A pattern, B pattern, and B pattern forms strain suppression portion 20 with effective dielectric layers 133 and ineffective dielectric layers 134 alternately stacked.

More specifically, the preparation of merely the A patterns and B patterns for the ceramic green sheets with the conductive patterns formed makes it possible to form main electrostatic capacitance portion 10 and strain suppression portion 20, and the mother laminated body can be thus easily and rapidly manufactured. It is to be noted that the A patterns and the B patterns can be used in an exchangeable manner by displacing the ceramic green sheets with one type of conductive patterns formed when the sheets are stacked. Therefore, the mother laminated body can be manufactured with the use of the ceramic green sheets with one type of conductive patterns formed.

Next, the mother laminated body is cut and divided into a predetermined shape to prepare a plurality of rectangular or substantially rectangular parallelepiped soft laminated bodies. It is to be noted that the rectangular or substantially rectangular parallelepiped soft laminated bodies may be subjected to barrel polishing to provide the soft laminated bodies with rounded corners.

The soft laminated body is cured by firing to prepare laminated body 110. The firing temperature is set appropriately depending on the types of the ceramic material and conductive material, and set in the range of, for example, higher than or equal to about 900° C. and lower than or equal to about 1300° C.

Next, the base layer is provided by applying a conductive paste for the formation of external electrodes to both ends of laminated body 110 through various printing methods, dip methods, or the like, and heating laminated body 110 with the conductive paste for the formation of external electrodes applied. The temperature for heating laminated body 110 with the conductive paste for the formation of external electrodes applied is preferably higher than or equal to about 700° C. and lower than or equal to about 900° C.

Next, on the base layer, the plated layer is provided by attaching a metallic constituent through a plating method. Electrolytic plating is preferred as the method for providing the plated method.

In accordance with the step of providing the base layer and the step of providing the plated layer, external electrodes 120 can be provided on both ends of laminated body 110, so as to be electrically connected to internal electrode 140. Laminated capacitor 100 according to the present preferred embodiment can be prepared in accordance with the steps described above.

In laminated capacitor 100 according to the present preferred embodiment, strain suppression portion 20 adjacent to main electrostatic capacitance portion 10 includes a plurality of ineffective dielectric layers 134 each sandwiched between a pair of internal electrodes 140 connected to the same external electrode 120, and at least one effective dielectric layer 133, thus suppressing strain in laminated body 110 due to strain in effective dielectric layers 133.

Specifically, when an alternating-current voltage or a direct-current voltage with an alternating-current component superimposed is applied to laminated capacitor 100, effective dielectric layers 133 are strained. Repeated generation of strain in accordance with the period of the alternating-current voltage or alternating-current component generates vibrations with effective dielectric layers 133 as a vibration source. The largest strain vibration in laminated body 110 is generated in main electrostatic capacitance portion 10 including a greatest number of effective dielectric layers 133.

Because ineffective dielectric layer 134 has almost no strain caused therein, strain suppression portion 20 including ineffective dielectric layer 134 thus suppresses strain in laminated body 110. With ineffective dielectric layer 134 located at second principal surface 112 side of main electrostatic capacitance portion 10, ineffective dielectric layer 134 suppresses the propagation, to second principal surface 112 side, of strain vibrations of laminated body 110 generated in main electrostatic capacitance portion 10.

Strain suppression portion 20 includes at least one effective dielectric layer 133, and strain vibrations of laminated body 110 are thus also generated in strain suppression portion 20. However, the strain vibrations of laminated body 110 generated in main electrostatic capacitance portion 10 and the strain vibrations of laminated body 110 generated in strain suppression portion 20 are generated in locations spaced away from each other that are separated by ineffective dielectric layer 134, and the strain vibrations generated in laminated body 110 thus have smaller amplitudes in terms of absolute value, as compared with cases of generation in continuous locations.

Furthermore, in strain suppression portion 20 according to the present preferred embodiment, multiple effective dielectric layers 133 are each separated by ineffective dielectric layer 134 located therebetween. The strain vibrations generated from each of multiple effective dielectric layers 133 included in strain suppression portion 20 are constrained by ineffective dielectric layer 134 located therebetween, and further interfere with each other, and the strain caused in laminated body 110 is thus suppressed.

Figure 6:
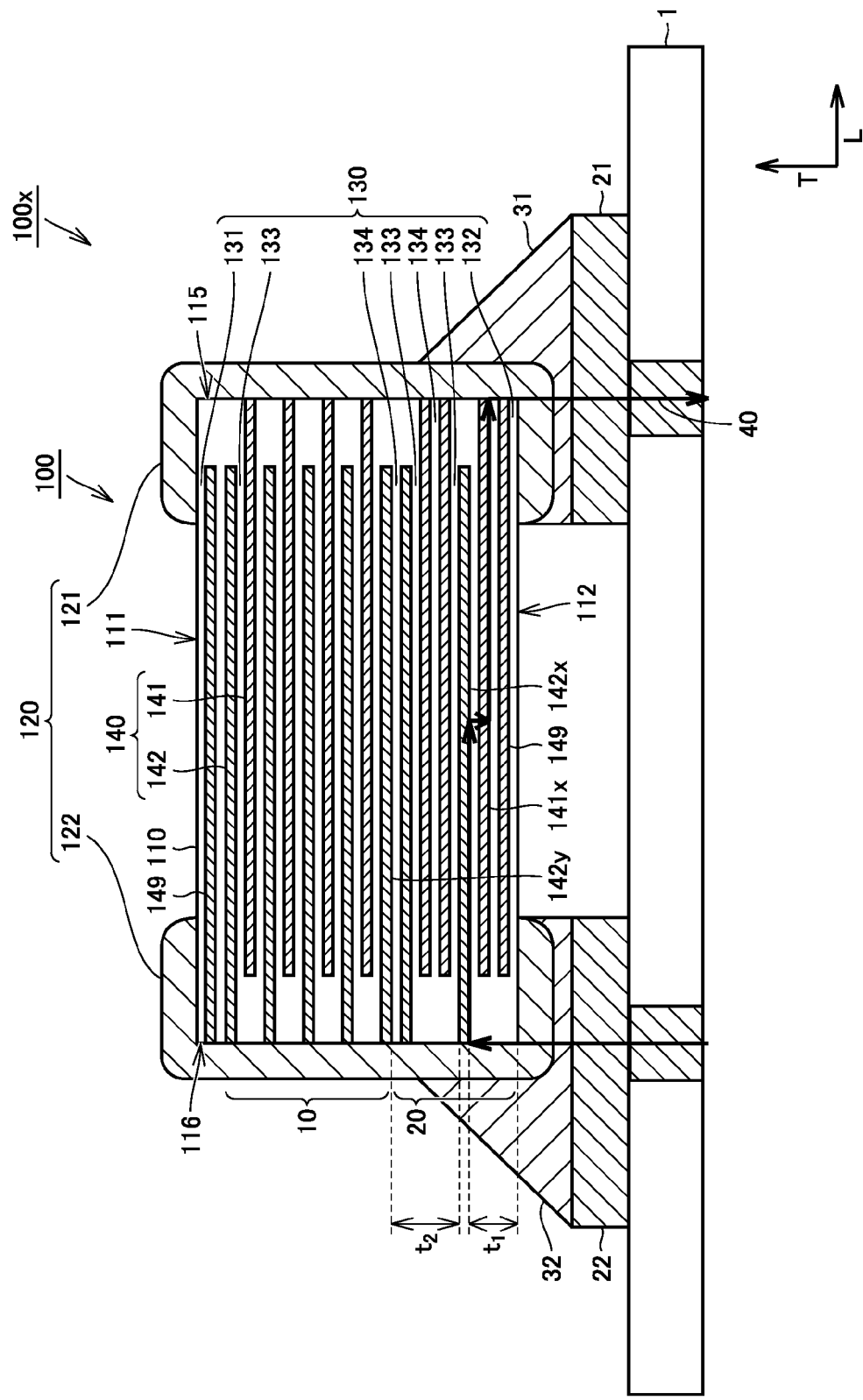
FIG. 6 is a cross-sectional view illustrating the configuration of a laminated capacitor mounted body according to Preferred Embodiment 1 of the present invention.

With reference to FIG. 6, a laminated capacitor mounted body will be described below where laminated capacitor 100 according to the present preferred embodiment is mounted on a mounting body.

As shown in FIG. 6, a laminated capacitor mounted body 100x according to Preferred Embodiment 1 of the present invention includes laminated capacitor 100, and mounting body 1 such as a circuit substrate, mounted with laminated capacitor 100. Laminated capacitor 100 is mounted on mounting body 1, with second principal surface 112 opposed to mounting body 1.

Specifically, mounting body 1 includes, on a surface thereof, a first land 21 and a second land 22 that are located at an interval therebetween. First external electrode 121 of laminated capacitor 100 and first land 21 are electrically connected with a solder 31 that is an adhesive. Second external electrode 122 of laminated capacitor 100 and second land 22 are electrically connected with a solder 32 that is an adhesive. Solders 31 and 32 are provided by reflow. It is to be noted that the adhesive is not limited to solders, but may be any material as long as the material can mechanically and electrically join external electrodes 120 to first and second lands 21 and 22.

Strain vibrations of laminated body 110 in laminated capacitor 100 propagate through solders 31 and 32 to mounting body 1 to generate noise referred to as acoustic noise when mounting body 1 vibrates at a frequency of 20 Hz to 20 kHz in an audible frequency range.

In laminated capacitor mounted body 100x, strain suppression portion 20 suppresses strain in laminated body 110 in laminated capacitor 100 to reduce strain vibrations that propagate to mounting body 1, and then reduce or prevent acoustic noise.

In addition, in laminated capacitor mounted body 100x, laminated capacitor 100 is mounted on mounting body 1 with second principal surface 112 opposed to mounting body 1 to locate ineffective dielectric layers 134 between main electrostatic capacitance portion 10 of laminated capacitor 100 and mounting body 1, and ineffective dielectric layers 134 thus suppress the propagation, to mounting body 1, of strain vibrations of laminated body 110 generated in main electrostatic capacitance portion 10.

Furthermore, main electrostatic capacitance portion 10 is biased at first principal surface 111 side in the stacking direction of laminated body 110 in laminated capacitor 100, and the distance between main electrostatic capacitance portion 10 of laminated capacitor 100 and mounting body 1 is thus made longer by mounting laminated capacitor 100 on mounting body 1 with second principal surface 112 located at mounting body 1 side in laminated capacitor mounted body 100x. Thus, the propagation path of strain vibrations of laminated body 110 generated in main electrostatic capacitance portion 10 is made longer to reduce strain vibrations that propagate to mounting body 1, and reduce or prevent acoustic noise.

It is to be noted that solders 31 and 32 are preferably located below main electrostatic capacitance portion 10 in the stacking direction of laminated body 110 in order to reduce the propagation, to mounting body 1, of strain vibrations of laminated body 110 generated in main electrostatic capacitance portion 10. More specifically, solders 31 and 32 preferably include upper ends located below internal electrode 142y located closest to second principal surface 112 side in main electrostatic capacitance portion 10 in the stacking direction of laminated body 110.

As shown in FIG. 6, in laminated capacitor mounted body 100x, strain suppression portion 20 of laminated capacitor 100 includes at least one effective dielectric layer 133 thus defining a shortest path circuit loop 40 that connects first land 21 and second land 22 of mounting body 1, solders 31 and 32, outer internal electrode 141x, and inner internal electrode 142x. As circuit loop 40 is made smaller, the ESL of laminated capacitor mounted body 100x is reduced.

From the perspective of reducing or preventing acoustic noise, the thickness $t_{20}$ of strain suppression portion 20 is preferably large in order to increase the distance between main electrostatic capacitance portion 10 of laminated capacitor 100 and mounting body 1. From the perspective of reducing ESL, the distance $t_1$ between inner internal electrode 142x and second principal surface 112 is preferably small in order to make circuit loop 40 smaller.

As mentioned above, in laminated capacitor 100, the distance $t_1$ between inner internal electrode 142x and second principal surface 112 is smaller than or equal to the distance $t_2$ between internal electrode 142y located closest to second principal surface 112 side in main electrostatic capacitance portion 10 and inner internal electrode 142x. In order to lower the sound pressure of noise generated from laminated capacitor mounted body 100x, both $t_1$ and $t_2$ mentioned above are preferably larger, and in order to reduce or prevent acoustic noise while suppressing ESL, it is desirable to increase $t_2$ mentioned above, rather than increase $t_1$ mentioned above. The noise generated from laminated capacitor mounted body 100x is increased as $t_1$ mentioned above is decreased, while the increase in $t_2$ mentioned above acts to reduce or prevent the noise. For this reason, the variation width of the sound pressure of noise generated from laminated capacitor mounted body 100x by increasing $t_2$ mentioned above while decreasing $t_1$ mentioned above is reduced to mitigate the impact on acoustic noise due to the decrease in $t_1$ mentioned above. Therefore, with the relationship of $t_1 \leq t_2$ met, the acoustic noise is further reduced while suppressing the ESL of the laminated capacitor mounted body. Thus, in laminated capacitor mounted body 100x, acoustic noise is reduced or prevented by increasing the thickness $t_{20}$ of strain suppression portion 20 while making circuit loop 40 smaller to reduce ESL within a range that meets the relationship of $t_{10} > t_{20}$.

However, the excessively small distance $t_1$ between inner internal electrode 142x and second principal surface 112 decreases the reliability of laminated capacitor 100, and thus, in laminated capacitor 100, the shortest distance $t_c$ between outer internal electrode 141x and second external electrode 122 is preferably larger than the shortest distance $t_a$ between outer internal electrode 141x and inner internal electrode 142x as shown in FIG. 5.

The reason is as follows. In laminated capacitor mounted body 100x, portions of external electrodes 120 that cover second principal surface 112 located at mounting body 1 side are likely to retain moisture coming from the outside.

When an alternating-current voltage or a direct-current voltage with an alternating-current component superimposed is applied to laminated capacitor 100, a potential difference is produced both between outer internal electrode 141x and inner internal electrode 142x, and between outer internal electrode 141x and second external electrode 122. When second external electrode 122 retains moisture, a short circuit is more likely to be caused due to the potential difference between outer internal electrode 141x and second external electrode 122, and laminated capacitor 100 undergoes a decrease in reliability. Therefore, with the relationship of $t_c > t_a$ met, ESL is reduced while maintaining the reliability of laminated capacitor 100.

When the interval between outer internal electrode 141x and second external electrode 122 is excessively short, there is a possibility that the dielectric layer therebetween will be strained to increase acoustic noise. Also from this perspective, it is preferable to meet the relationship of $t_c > t_a$.

In the present preferred embodiment, laminated body 110 includes at least one internal conductor 149 in contact with first outer layer 131, which makes substantially no contribution to the generation of electrostatic capacitance. Internal conductor 149 is connected to external electrode 120 in the same manner as internal electrodes 140 located closest to first principal surface 111 side in main electrostatic capacitance portion 10. Internal conductor 149 in contact with first outer layer 131 increases the rigidity of first outer layer 131, and constrains strain in main electrostatic capacitance portion 10. From the perspective of constraining strain in main electrostatic capacitance portion 10, internal conductor 149 is preferably located near main electrostatic capacitance portion 10, and the interval between internal electrode 140 located closest to first principal surface 111 side in main electrostatic capacitance portion 10 and internal conductor 149 is preferably equal or substantially equal to the thickness of effective dielectric layer 133 included in main electrostatic capacitance portion 10.

Furthermore, in the present preferred embodiment, laminated body 110 includes at least one internal conductor 149 in contact with second outer layer 132, which makes substantially no contribution to the generation of electrostatic capacitance. Internal conductor 149 is connected to external electrode 120 in the same manner as outer internal electrode 141x of strain suppression portion 20. Internal conductor 149 in contact with second outer layer 132 increases the rigidity of second outer layer 132, and suppresses the propagation, to second principal surface 112 side (that is, mounting body 1), of strain vibrations of laminated body 110 generated in main electrostatic capacitance portion 10.

With reference to the drawings, a laminated capacitor series including a plurality of laminated capacitors 100 according to the present preferred embodiment will be described below.

Figure 7:
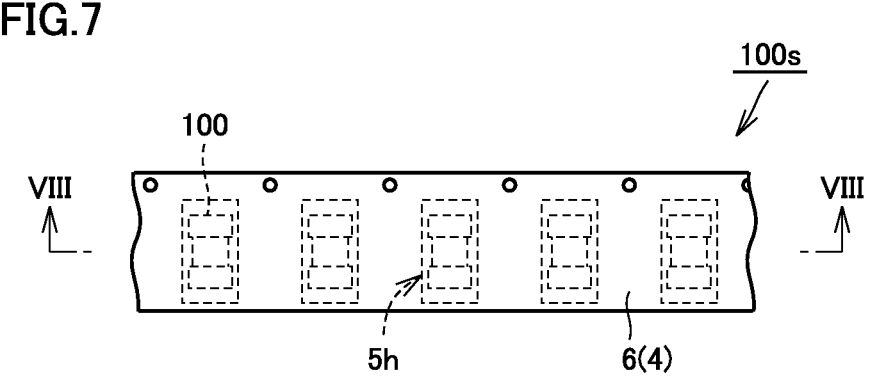
FIG. 7 is a planar view illustrating the configuration of a laminated capacitor series according to Preferred Embodiment 1 of the present invention.
Figure 8:
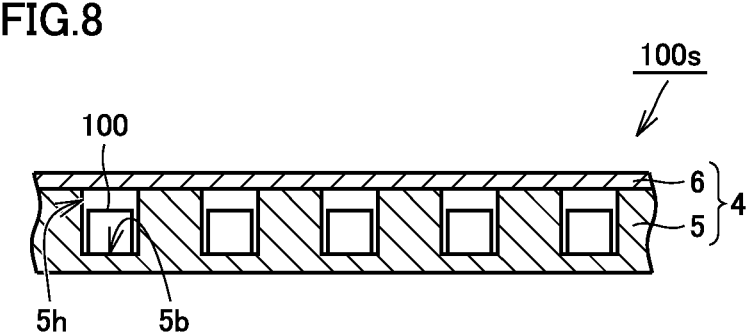
FIG. 8 is a cross-sectional view of the laminated capacitor series in FIG. 7, as viewed from a direction of arrows along the line VIII-VIII.

FIG. 7 is a planar view illustrating the configuration of a laminated capacitor series according to Preferred Embodiment 1 of the present invention. FIG. 8 is a cross-sectional view of the laminated capacitor series in FIG. 7, as viewed from a direction of allows along the line VIII-VIII.

As shown in FIGS. 7 and 8, a laminated capacitor series 100s according to Preferred Embodiment 1 of the present invention includes: a plurality of laminated capacitors 100; and a packing body 4 including an elongated carrier tape 5 provided with a plurality of recesses 5h at intervals for respectively housing a plurality of laminated capacitors 100, and a cover tape 6 attached to carrier tape 5 to seal a plurality of recesses 5h. Laminated capacitors 100 are respectively housed in recesses 5h, with second principal surfaces 112 located at bottom 5b sides of recesses 5h.

Laminated capacitors 100 included in laminated capacitor series 100s are taken out one by one from packing body 4, and mounted on mounting body 1. Specifically, with cover tape 6 peeled from carrier tape 5, laminated capacitors 100 are taken out one by one from carrier tape 5 and mounted on mounting body 1 by adsorbing and retaining first principal surfaces 111 of laminated capacitors 100. As a result, laminated capacitors 100 are mounted on mounting body 1, with second principal surfaces 112 of laminated capacitors 100 located at mounting body 1 side.

More specifically, laminated capacitor mounted body 100x according to Preferred Embodiment 1 of the present invention can be easily manufactured through the use of laminated capacitor series 100s according to Preferred embodiment 1 of the present invention.

Preferred Embodiment 2

Figure 9:
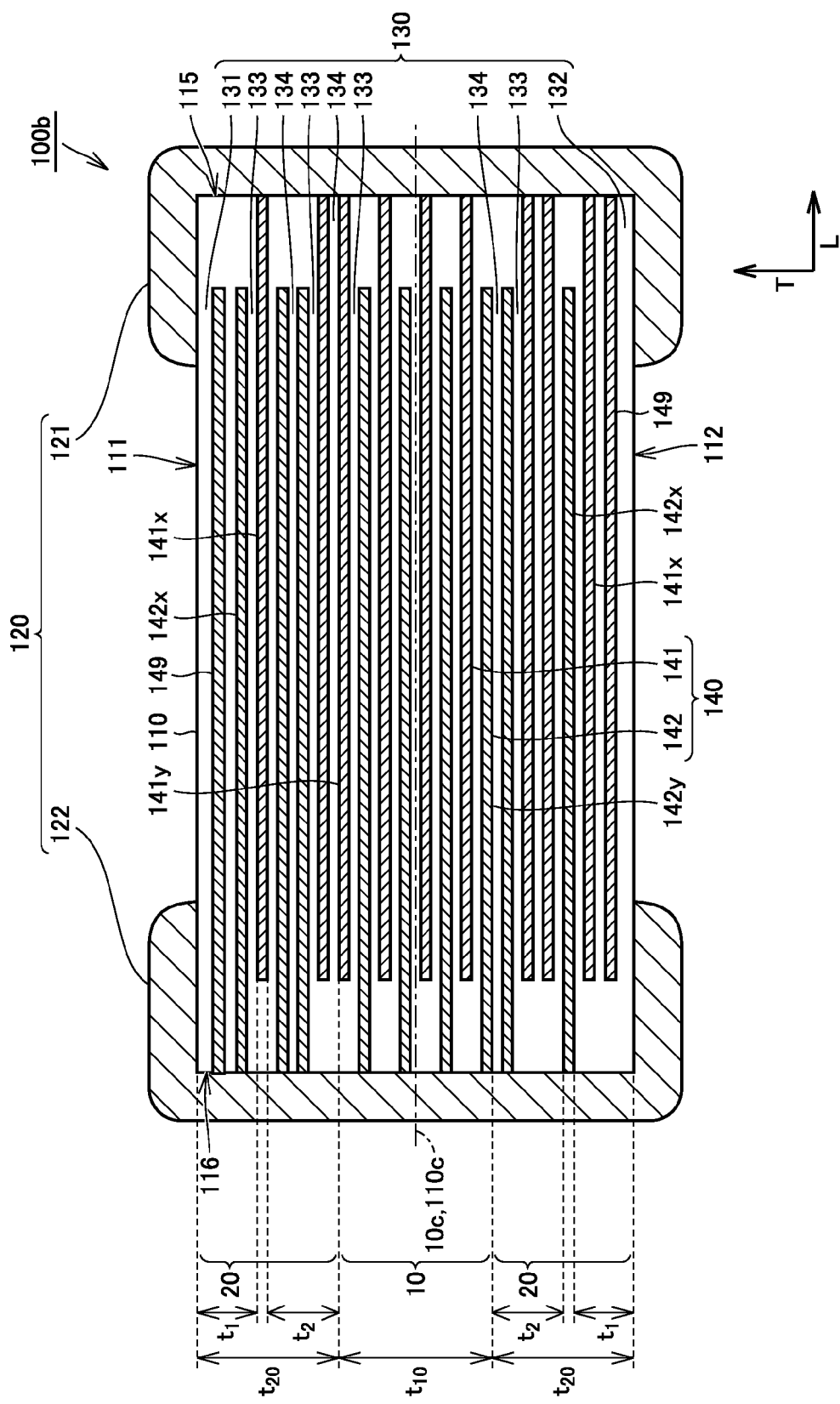
FIG. 9 is a cross-sectional view illustrating the configuration of a laminated capacitor according to Preferred Embodiment 2 of the present invention.
Figure 10:
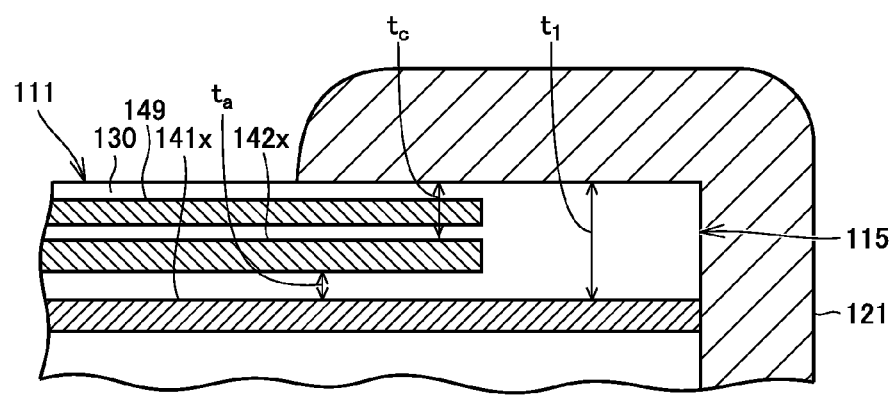
FIG. 10 is an enlarged cross-sectional view of an end on a first principal surface side of the laminated capacitor in FIG. 9.

With reference to FIGS. 9 and 10, a laminated capacitor according to Preferred embodiment 2 of the present invention, and a laminated capacitor series and a laminated capacitor mounted body including the capacitor will be described below. It is to be noted that in the following description of the present preferred embodiment, only configurations will be described that differ from the laminated capacitor, and laminated capacitor series and laminated capacitor mounted body including the capacitor according to Preferred Embodiment 1, but the description of the same configurations will not be repeated. It is to be noted that FIG. 9 illustrates a cross-sectional view in the same manner as FIG. 2.

As shown in FIGS. 9 and 10, a laminated capacitor 100b according to Preferred Embodiment 2 of the present invention has a laminated body 110 further including other strain suppression portion 20 as a second sub-electrostatic capacitance portion sandwiched between a main electrostatic capacitance portion 10 and a first principal surface 111. Other strain suppression portion 20 includes a plurality of other ineffective dielectric layers 134 each sandwiched between a pair of internal electrodes 140 connected to the same external electrode 120, and at least one effective dielectric layer 133. One of other ineffective dielectric layers 134 among the plurality of other ineffective dielectric layers 134 is adjacent to main electrostatic capacitance portion 10. Specifically, one of other ineffective dielectric layers 134 among the plurality of other ineffective dielectric layers 134 is adjacent to main electrostatic capacitance portion 10 at first principal surface 111 side.

In the present preferred embodiment, all of effective dielectric layers 133 and ineffective dielectric layers 134 included in laminated body 110 are uniform or substantially uniform in thickness. As shown in FIG. 10, effective dielectric layers 133 and other ineffective dielectric layers 134 are each to in thickness.

The number of effective dielectric layers 133 included in main electrostatic capacitance portion 10 is larger than the number of effective dielectric layers 133 included in other strain suppression portion 20. Main electrostatic capacitance portion 10 is thicker than other strain suppression portion 20. More specifically, as shown in FIG. 9, the condition of $t_{10} > t_{20}$ is satisfied when the thickness of main electrostatic capacitance portion 10 is denoted by $t_{10}$, whereas the thickness of other strain suppression portion 20 is denoted by $t_{20}$.

The distance $t_1$ between other inner internal electrode 141x adjacent to, at second principal surface 112 side, effective dielectric layer 133 closest to first principal surface 111 side in other strain suppression portion 20 and first principal surface 111 is shorter than or equal to the distance $t_2$ between an internal electrode 141y closest to first principal surface 111 in main electrostatic capacitance portion 10 and other inner internal electrode 141x.

In the present preferred embodiment, a center 10c of main electrostatic capacitance portion 10 has an overlap with a center 110c of laminated body 110 in the stacking direction mentioned above. More specifically, main electrostatic capacitance portion 10 is located in the center of laminated body 110 in the stacking direction. It is to be noted that main electrostatic capacitance portion 10 may not be located in the center of laminated body 110 in the stacking direction.

As shown in FIG. 10, the shortest distance $t_c$ between other outer internal electrode 142x adjacent to, at first principal surface 111 side, effective dielectric layer 133 closest to first principal surface 111 in other strain suppression portion 20 and a first external electrode 121 connected to other inner internal electrode 141x is larger than the shortest distance $t_a$ between other outer internal electrode 142x and other inner internal electrode 141x.

In laminated capacitor 100b according to the present preferred embodiment, other strain suppression portion 20 adjacent to main electrostatic capacitance portion 10 includes a plurality of other ineffective dielectric layers 134 each sandwiched between a pair of internal electrodes 140 connected to the same external electrode 120, and at least one effective dielectric layer 133, thus suppressing strain in laminated body 110 due to strain in effective dielectric layers 133.

Specifically, when an alternating-current voltage or a direct-current voltage with an alternating-current component superimposed is applied to laminated capacitor 100b, effective dielectric layers 133 are strained. Repeated generation of strain in accordance with the period of the alternating-current voltage or alternating-current component generates vibrations with effective dielectric layers 133 as a vibration source. The largest strain vibration in laminated body 110 is generated in main electrostatic capacitance portion 10 including a greatest number of effective dielectric layers 133.

Because other ineffective dielectric layer 134 has almost no strain caused therein, other strain suppression portion 20 including other ineffective dielectric layer 134 thus suppresses strain in laminated body 110. With other ineffective dielectric layer 134 located to main electrostatic capacitance portion 10 at first principal surface 111 side, other ineffective dielectric layer 134 suppresses the propagation, to first principal surface 111 side, of strain vibrations of laminated body 110 generated in main electrostatic capacitance portion 10.

Other strain suppression portion 20 includes at least one effective dielectric layer 133, and strain vibrations of laminated body 110 are thus also generated in other strain suppression portion 20. However, the strain vibrations mentioned above and the strain vibrations of laminated body 110 generated in main electrostatic capacitance portion 10 are generated in locations away from each other that are separated by ineffective dielectric layer 134, and the strain vibrations generated in laminated body 110 thus have smaller amplitudes in terms of absolute value, as compared with cases of generation in continuous locations.

As mentioned above, laminated capacitor 100b according to the present preferred embodiment suppresses the propagation, to both first principal surface 111 side and second principal surface 112 side, of strain vibrations of laminated body 110 generated in main electrostatic capacitance portion 10. Therefore, in the case of mounting laminated capacitor 100b on a mounting body 1, any of first principal surface 111 and second principal surface 112 of laminated capacitor 100b may be located at mounting body 1 side.

When second principal surface 112 of laminated capacitor 100b is located at mounting body 1 side, other strain suppression portion 20 constrains strain in main electrostatic capacitance portion 10. In addition, internal electrodes 140 of other strain suppression portion 20 increase the rigidity of other strain suppression portion 20, whereas an internal conductor 149 in contact with a first outer layer 131 increases the rigidity of first outer layer 131, thus increasing the effect of constraining strain in main electrostatic capacitance portion 10. Furthermore, an internal conductor 149 in contact with a second outer layer 132 increases the rigidity of second outer layer 132 to suppress the propagation, to mounting body 1, of strain vibrations of laminated body 110b generated in main electrostatic capacitance portion 10.

In contrast, when first principal surface 111 of laminated capacitor 100b is located at mounting body 1 side, strain suppression portion 20 constrains strain in main electrostatic capacitance portion 10. In addition, internal electrodes 140 of other strain suppression portion 20 increase the rigidity of other strain suppression portion 20, whereas internal conductor 149 in contact with second outer layer 132 increases the rigidity of second outer layer 132, thus increasing the effect of constraining strain in main electrostatic capacitance portion 10. Furthermore, internal conductor 149 in contact with first outer layer 131 increases the rigidity of first outer layer 131 to suppress the propagation, to mounting body 1, of strain vibrations of laminated body 110b generated in main electrostatic capacitance portion 10.

Therefore, in a laminated capacitor series including a plurality of laminated capacitors 100b according to the present preferred embodiment, each of laminated capacitors 100b respectively housed in a plurality of recesses 5h may have any of first principal surface 111 and second principal surface 112 located at bottom 5b sides of recesses 5h.

Thus, the necessity to distinguish between first principal surfaces 111 and second principal surfaces 112 of laminated capacitors 100b is eliminated in housing a plurality of laminated capacitors 100b respectively in a plurality of recesses 5h of a carrier tape 5. Therefore, the laminated capacitor series is easily manufactured.

In the present preferred embodiment, the excessively small distance $t_1$ between other inner internal electrode 141x and first principal surface 111 decreases the reliability of laminated capacitor 100b, and thus, in laminated capacitor 100b, the shortest distance $t_c$ between other outer internal electrode 142x and first external electrode 121 is preferably larger than the shortest distance to between other outer internal electrode 142x and other inner internal electrode 141x as shown in FIG. 10.

The reason is as follows. In a laminated capacitor mounted body, portions of external electrodes 120 that cover first principal surface 111 are likely to retain moisture coming from the outside when first principal surface 111 is located at mounting body 1 side.

When an alternating-current voltage or a direct-current voltage with an alternating-current component superimposed is applied to laminated capacitor 100b, a potential difference is produced both between other outer internal electrode 142x and other inner internal electrode 141x, and between other outer internal electrode 142x and first external electrode 121. When first external electrode 121 retains moisture, a short circuit is more likely to be caused due to the potential difference between other outer internal electrode 142x and first external electrode 121, and laminated capacitor 100b undergoes a decrease in reliability. Therefore, with the relationship of $t_c > t_a$ satisfied, ESL is reduced while maintaining the reliability of laminated capacitor 100b.

Preferred Embodiment 3

Figure 11:
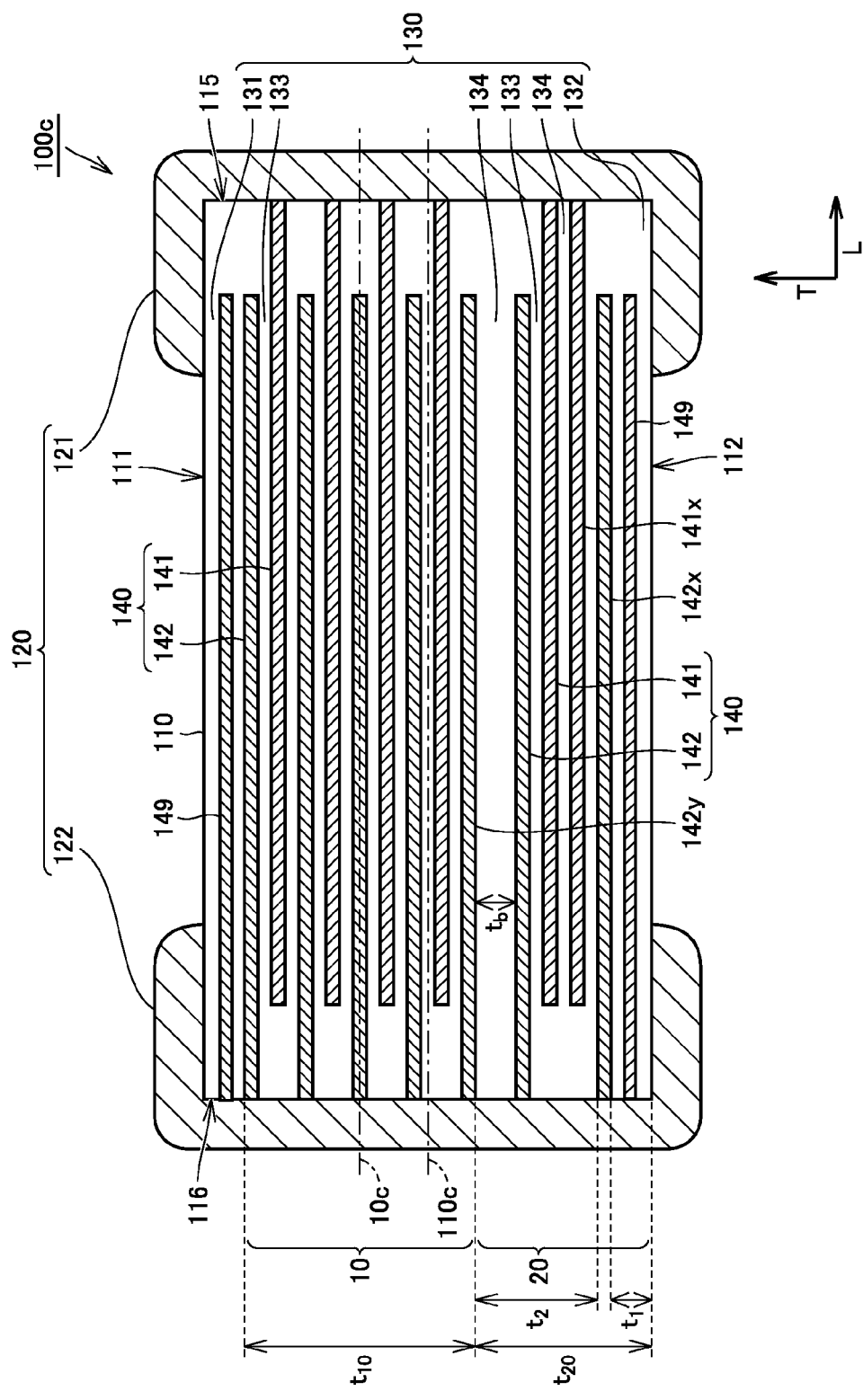
FIG. 11 is a cross-sectional view illustrating the configuration of a laminated capacitor according to Preferred Embodiment 3 of the present invention.

With reference to FIG. 11, a laminated capacitor according to Preferred Embodiment 3 of the present invention, and a laminated capacitor series and a laminated capacitor mounted body including the capacitor will be described below. It is to be noted that FIG. 11 illustrates a cross-sectional view in the same manner as FIG. 2.

As shown in FIG. 11, in a laminated capacitor 100c according to Preferred Embodiment 3 of the present invention, an ineffective dielectric layer 134 adjacent to a main electrostatic capacitance portion 10 is thicker than each effective dielectric layer 133 in main electrostatic capacitance portion 10. The condition of $t_b > 2t_a$ is satisfied when the thickness of each effective dielectric layer 133 is denoted by $t_a$, whereas the thickness of ineffective dielectric layer 134 adjacent to main electrostatic capacitance portion 10 is denoted by $t_b$.

The effect of suppressing strain in a laminated body 110 is increased with the increase in the thickness $t_b$ of ineffective dielectric layer 134 adjacent to main electrostatic capacitance portion 10. Therefore, acoustic noise is reduced or prevented effectively by satisfying the condition of $t_b > 2t_a$.

Furthermore, the thickness $t_b$ of ineffective dielectric layer 134 adjacent to main electrostatic capacitance portion 10 is preferably larger than the distance $t_1$ between an inner internal electrode 142x and a second principal surface 112. The effect of reducing ESL is increased with the decrease in the distance $t_1$ between inner internal electrode 142x and second principal surface 112. Therefore, acoustic noise and ESL are reduced or prevented effectively by satisfying the relationship of $t_b > t_1$.

It is to be noted that when the present preferred embodiment is applied to laminated capacitor 100b according to Preferred Embodiment 2, another ineffective dielectric layer 134 adjacent to main electrostatic capacitance portion 10 is thicker than each effective dielectric layer 133 in main electrostatic capacitance portion 10.

Specifically, another ineffective dielectric layer 134 adjacent to main electrostatic capacitance portion 10 is thicker than each effective dielectric layer 133 in main electrostatic capacitance portion 10. The condition of $t_b > 2t_a$ is satisfied when the thickness of each effective dielectric layer 133 is denoted by $t_a$, whereas the thickness of other ineffective dielectric layer 134 located adjacent to main electrostatic capacitance portion 10 is denoted by $t_b$.

Preferred Embodiment 4

Figure 12:
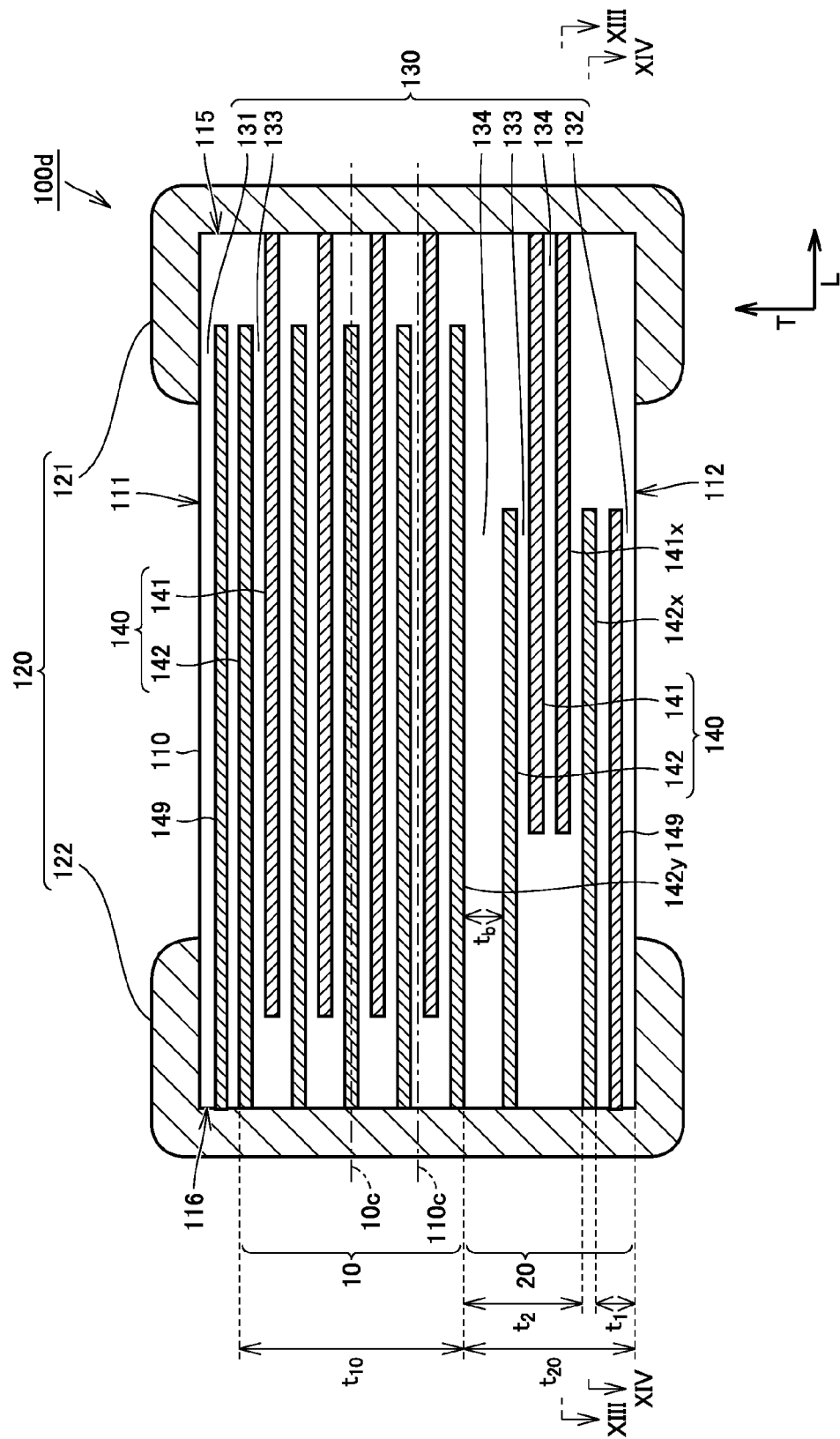
FIG. 12 is a cross-sectional view illustrating the configuration of a laminated capacitor according to Preferred Embodiment 4 of the present invention.
Figure 13:
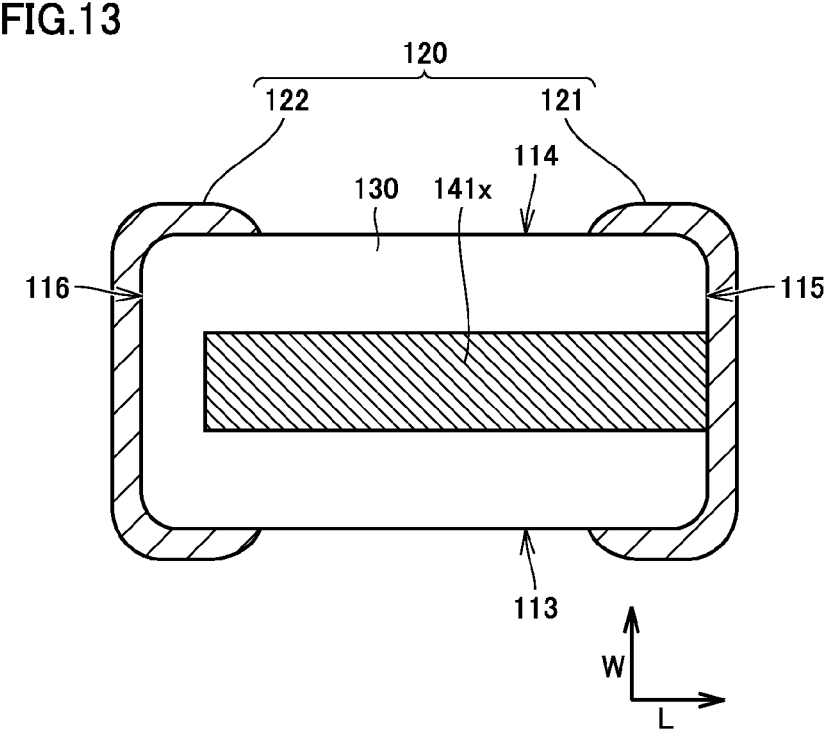
FIG. 13 is a cross-sectional view of the laminated capacitor in FIG. 12, as viewed from a direction of arrows along the line XIII-XIII.
Figure 14:
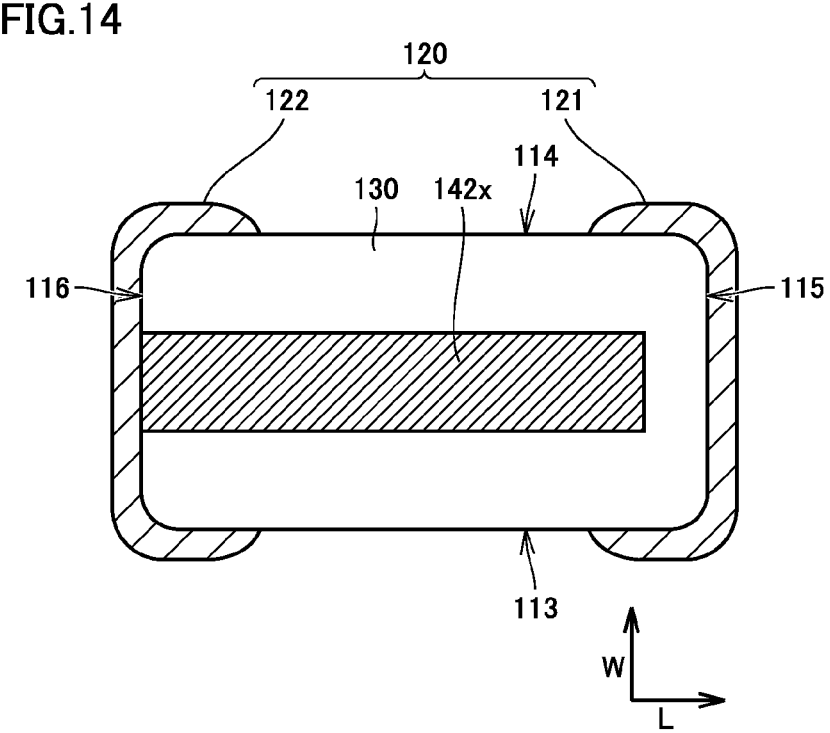
FIG. 14 is a cross-sectional view of the laminated capacitor in FIG. 12, as viewed from a direction of arrows along the line XIV-XIV.

With reference to FIGS. 12 to 14, a laminated capacitor according to Preferred Embodiment 4 of the present invention, and a laminated capacitor series and a laminated capacitor mounted body including the capacitor will be described below.

As shown in FIGS. 12 to 14, in a laminated capacitor 100d according to Preferred Embodiment 4 of the present invention, the electrostatic capacitance for each effective dielectric layer 133 included in a strain suppression portion 20 is lower than the electrostatic capacitance for each effective dielectric layer 133 included in a main electrostatic capacitance portion 10. More specifically, the electrostatic capacitance of a unit capacitor including each of effective dielectric layers 133 of strain suppression portion 20 is lower than the electrostatic capacitance of a unit capacitor including each of effective dielectric layers 133 of main electrostatic capacitance portion 10.

In the present preferred embodiment, the electrostatic capacitance of a unit capacitor including each of effective dielectric layers 133 of strain suppression portion 20 preferably is less than or equal to about 80% of the electrostatic capacitance of a unit capacitor including each of effective dielectric layers 133 of main electrostatic capacitance portion 10.

In this regard, the electrostatic capacitance C of the capacitor meets C=∈s/d when the dielectric constant of effective dielectric layer 133 is denoted by ∈, the area of internal electrodes 140 opposed to each other is denoted by s, and the interval between internal electrodes 140 is denoted by d.

As can be also seen from the formula mentioned above, any of the dielectric constant ∈ of effective dielectric layer 133, area s of internal electrodes 140 opposed to each other, and interval d between internal electrodes 140 may be changed in order to change the electrostatic capacitance C of the capacitor.

In the present preferred embodiment, the area s of internal electrodes 140 opposed to each other preferably is changed. Specifically, in order to make the electrostatic capacitance of a unit capacitor including each of effective dielectric layers 133 of strain suppression portion 20 lower than the electrostatic capacitance of a unit capacitor including each of effective dielectric layers 133 of main electrostatic capacitance portion 10, the area of internal electrodes 140 opposed to each other while sandwiching each of effective dielectric layers 133 of strain suppression portion 20 preferably is adjusted to less than or equal to about 80% of the area of internal electrodes 140 opposed to each other while sandwiching each of effective dielectric layers 133 included in main electrostatic capacitance portion 10.

More specifically, the long dimension of internal electrodes 140 opposed to each other while sandwiching each of effective dielectric layers 133 of strain suppression portion 20 is made smaller than the long dimension of internal electrodes 140 opposed to each other while sandwiching each of effective dielectric layers 133 included in main electrostatic capacitance portion 10 as shown in FIG. 12, while the wide dimension of internal electrodes 140 opposed to each other while sandwiching each of effective dielectric layers 133 of strain suppression portion 20 is made smaller than the wide dimension of internal electrodes 140 opposed to each other while sandwiching each of effective dielectric layers 133 included in main electrostatic capacitance portion 10 as shown in FIGS. 3, 4, 13, and 14.

Alternatively, instead of changing the area s of internal electrodes 140 opposed to each other, the interval d between internal electrodes 140 may be changed. Specifically, in order to make the electrostatic capacitance of a unit capacitor including each of effective dielectric layers 133 of strain suppression portion 20 lower than the electrostatic capacitance of a unit capacitor including each of effective dielectric layers 133 of main electrostatic capacitance portion 10, the interval between internal electrodes 140 that sandwich each of effective dielectric layers 133 of strain suppression portion 20 may be adjusted to greater than or equal to about 125% of the interval between internal electrodes 140 that sandwich each of effective dielectric layers 133 included in main electrostatic capacitance portion 10.

Moreover, instead of changing the area s of internal electrodes 140 opposed to each other, the dielectric constant ∈ of effective dielectric layer 133 may be changed. Specifically, in order to make the electrostatic capacitance of a unit capacitor including each of effective dielectric layers 133 of strain suppression portion 20 lower than the electrostatic capacitance of a unit capacitor including each of effective dielectric layers 133 of main electrostatic capacitance portion 10, the dielectric constant of effective dielectric layers 133 included in strain suppression portion 20 may be adjusted to less than or equal to about 80% of the dielectric constant of effective dielectric layers 133 included in main electrostatic capacitance portion 10.

Strain vibrations of a laminated body 110 generated in strain suppression portion 20 can be reduced by making the electrostatic capacitance of a unit capacitor including each of effective dielectric layers 133 of strain suppression portion 20 lower than the electrostatic capacitance of a unit capacitor including each of effective dielectric layers 133 of main electrostatic capacitance portion 10 as described above. Thus, strain vibrations that propagate to a mounting body 1 are reduced, and acoustic noise is also significantly reduced or prevented.

It is to be noted that when the present preferred embodiment is applied to laminated capacitor 100b according to Preferred Embodiment 2, the electrostatic capacitance for each effective dielectric layer 133 included in other strain suppression portion 20 is lower than the electrostatic capacitance for each effective dielectric layer 133 included in main electrostatic capacitance portion 10.

Specifically, the area of internal electrodes 140 opposed to each other while sandwiching each of effective dielectric layers 133 included in other strain suppression portion 20 preferably is adjusted to less than or equal to about 80% of the area of internal electrodes 140 opposed to each other while sandwiching each of effective dielectric layers 133 included in main electrostatic capacitance portion 10. Alternatively, the interval between internal electrodes 140 that sandwich each of effective dielectric layers 133 of other strain suppression portion 20 preferably is adjusted to greater than or equal to about 125% of the interval between internal electrodes 140 that sandwich each of effective dielectric layers 133 included in main electrostatic capacitance portion 10. Alternatively, the dielectric constant of effective dielectric layers 133 included in other strain suppression portion 20 preferably is adjusted to less than or equal to about 80% of the dielectric constant of effective dielectric layers 133 included in main electrostatic capacitance portion 10.

Preferred Embodiment 5

Figure 15:
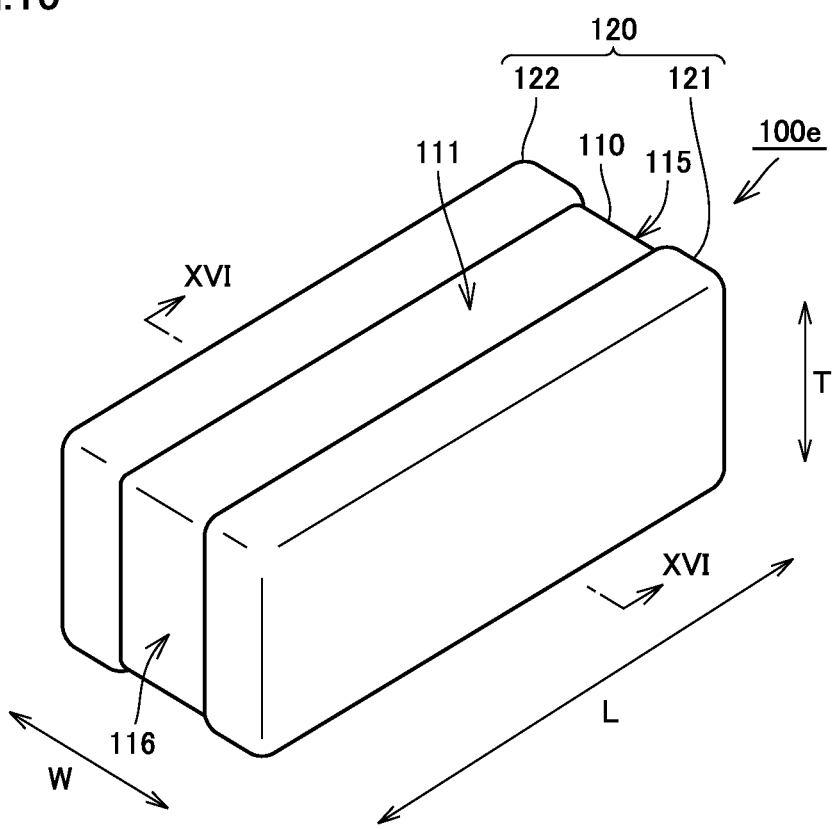
FIG. 15 is a perspective view illustrating the appearance of a laminated capacitor according to Preferred Embodiment 5 of the present invention.
Figure 16:
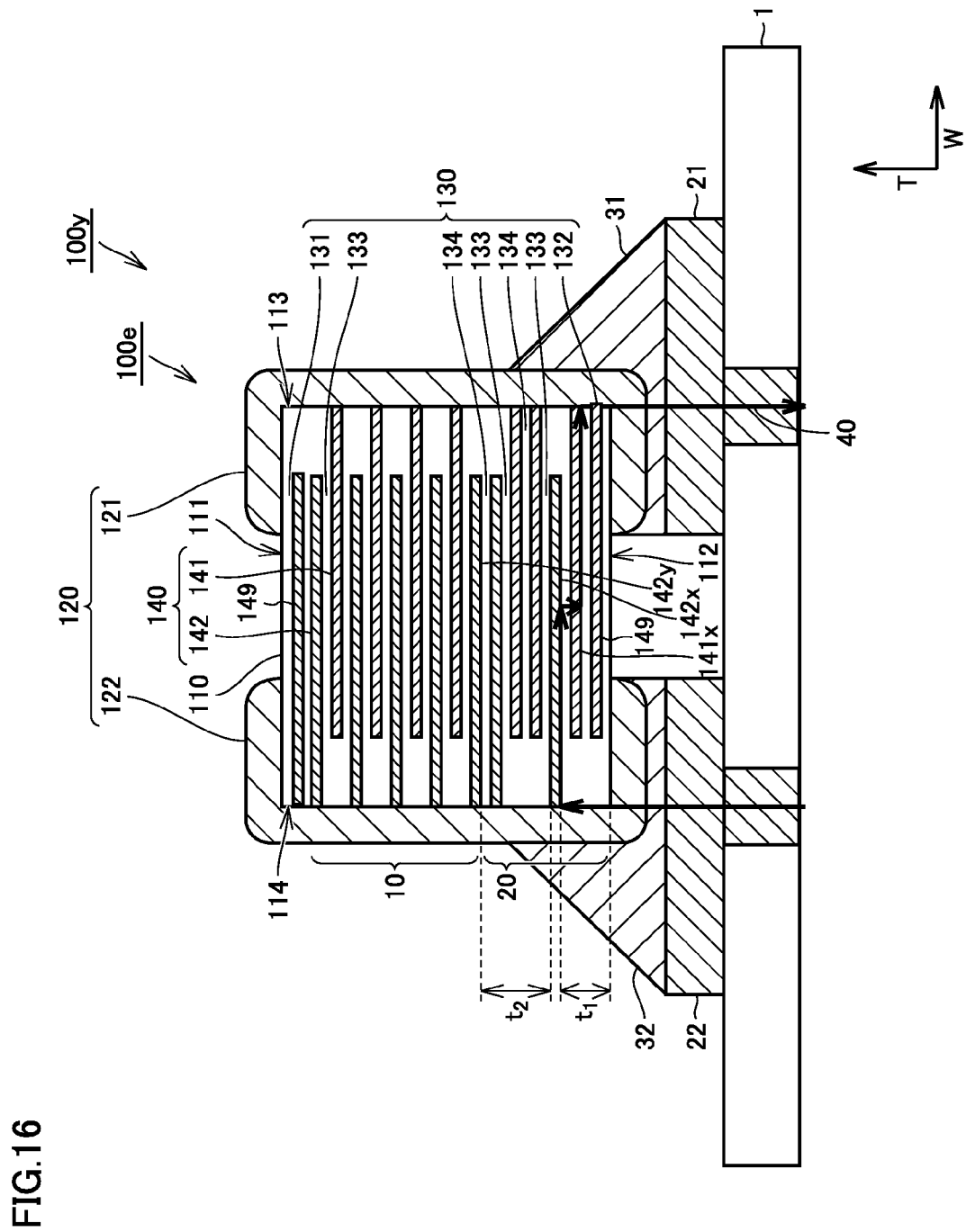
FIG. 16 is a cross-sectional view illustrating the configuration of a laminated capacitor mounted body according to Preferred Embodiment 5 of the present invention, as viewed from a direction of arrows along the line XVI-XVI in FIG. 15.

With reference to FIGS. 15 and 16, a laminated capacitor according to Preferred Embodiment 5 of the present invention, and a laminated capacitor series and a laminated capacitor mounted body including the capacitor will be described below.

As shown in FIGS. 15 and 16, a laminated capacitor 100e according to Preferred Embodiment 5 of the present invention includes external electrodes 120 provided on both sides in a width direction W of a laminated body 110. Specifically, external electrodes 120 include a first external electrode 121 provided on a first side surface 113 in the width direction W of laminated body 110; and a second external electrode 122 provided on a second side surface 114 in the width direction W of laminated body 110.

Internal electrodes 140 include a plurality of first internal electrodes 141 electrically connected to first external electrode 121; and a plurality of second internal electrodes 142 electrically connected to second external electrode 122. First internal electrodes 141 and second internal electrodes 142 each preferably have a rectangular or substantially rectangular shape in planar view. First internal electrodes 141 and second internal electrodes 142 are opposed to each other with effective dielectric layers 133 interposed therebetween.

In the present preferred embodiment, a plurality of first internal electrodes 141 and first external electrode 121 are connected at first side surface 113. A plurality of second internal electrodes 142 and second external electrode 122 are connected at second end surface 114.

As a result, a laminated capacitor mounted body 100y according to Preferred Embodiment 5 of the present invention has a shorter interval between first external electrode 121 and second external electrode 122, as compared with laminated capacitor mounted body 100x according to Preferred embodiment 1. Accordingly, a mounting body 1 has a shorter interval between a first land 21 and a second land 22.

When mounting body 1 vibrates by the propagation, to mounting body 1, of strain vibrations of laminated body 110 in laminated capacitor 100e, mounting body 1 repeats expansion and contraction between first land 21 and second land 22. Therefore, the expansion and contraction length of mounting body 1 is shortened by shortening the interval between first land 21 and second land 22, vibrations of mounting body are significantly reduced or prevented suppressed, and acoustic noise thus is significantly reduced or prevented.

Furthermore, a shortest path circuit loop 40 that connects first land 21 and second land 22 of mounting body 1, solders 31 and 32, an outer internal electrode 141x, and an inner internal electrode 142x is made smaller by shortening the interval between first land 21 and second land 22. Therefore, laminated capacitor mounted body 100y according to the present preferred embodiment further reduces ESL, as compared with laminated capacitor mounted body 100x according to Preferred Embodiment 1.

A method for measuring thicknesses and distances within a laminated capacitor will be described below.

First, the laminated capacitor is filled with a resin. The laminated capacitor filled with the resin is polished to expose an LT cross section passing through the center of a laminated body and parallel to a side surface of the laminated body. The exposed LT cross section is subjected to ion milling to remove a shear drop produced by the polishing. Thereafter, the exposed LT cross section is observed with a scanning electron microscope.

Figure 17:
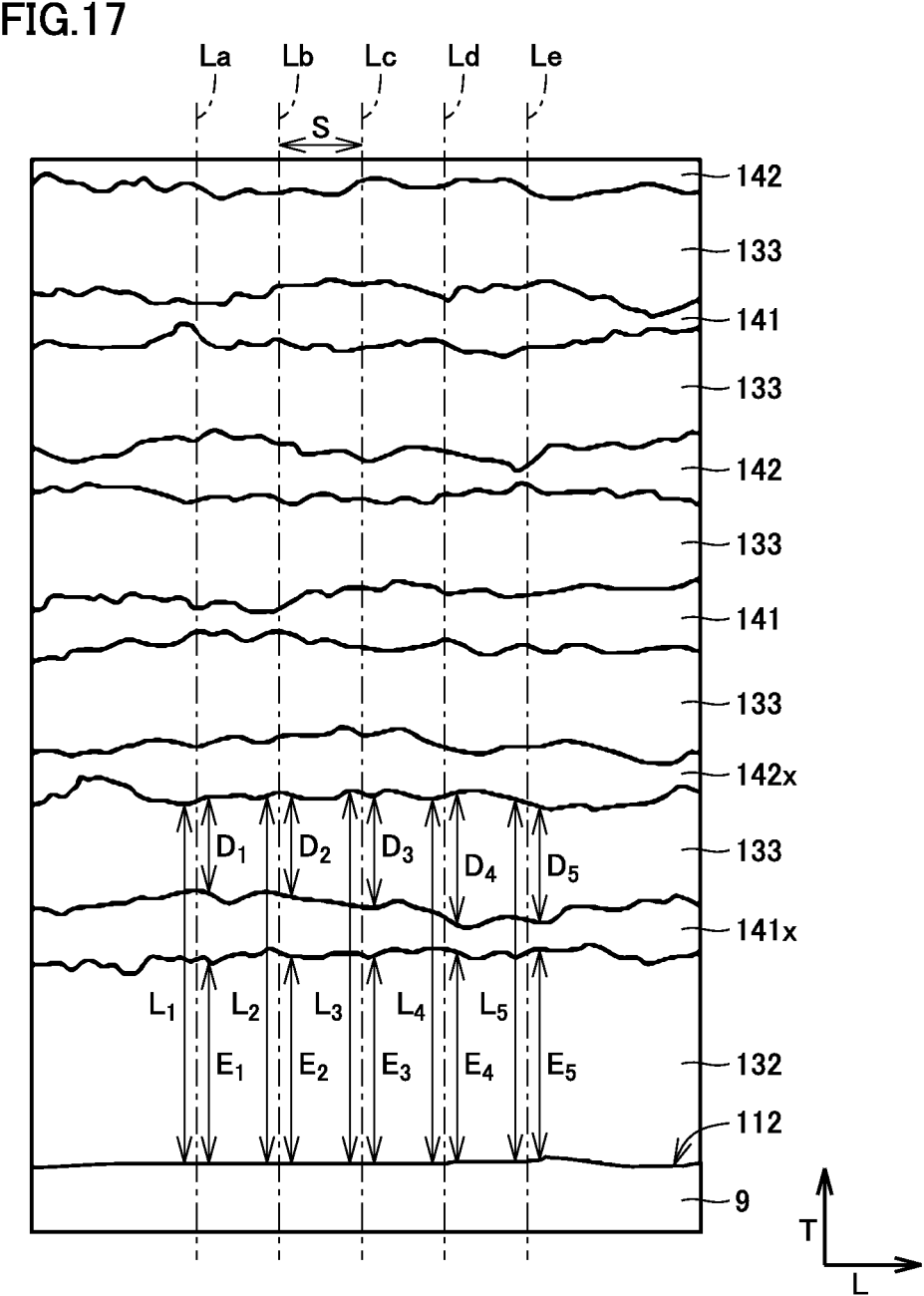
FIG. 17 is a diagram showing an example of an enlarged image obtained by observing an LT cross section of a laminated capacitor with a scanning electron microscope.

FIG. 17 is a diagram showing an example of an enlarged image obtained by observing an LT cross section of a laminated capacitor with a scanning electron microscope. FIG. 17 illustrates therein a portion of a laminated capacitor at a second principal surface 112 side in contact with a resin 9.

In the measurement of a thickness or a distance within the laminated capacitor, first, a line Lc extending in the stacking direction of a laminated body and passing through the center in a length direction L of the laminated body is drawn on an enlarged image obtained by observing the LT cross section of the laminated capacitor with a scanning electron microscope as shown in FIG. 17. Next, multiple lines parallel to the line Lc are drawn at regular intervals (pitch S). The pitch S may be determined on the order of five to ten times as large as the thickness or distance to be measured, and for example, with pitch S=about 5 μm in the case of measuring a dielectric layer of 1 μm in thickness. In addition, the same number of lines are drawn on both sides of the line Lc. More specifically, an odd number of lines are drawn, including the line Lc. In FIG. 17, five lines of line La to line Le are shown.

Next, the thickness or distance is measured on each of the line La to the line Le. However, when due to the loss of an internal electrode, dielectric layers for sandwiching the internal electrode are connected to each other on each of the line La to the line Le, or when the enlarged image is not clear in measurement locations, the thickness or distance is measured on a line further away from the line Lc.

For example, in the measurement of the thickness of effective dielectric layer 133, a thickness $D_1$ on the line La, a thickness $D_2$ on the line Lb, a thickness $D_3$ on the line Lc, a thickness $D_4$ on the line Ld, and a thickness $D_5$ on the line Le are measured as shown in FIG. 17, and the average value for the thicknesses is regarded as the thickness of effective dielectric layer 133.

Likewise, in the measurement of the thickness of a second outer layer 132, a thickness $E_1$ on the line La, a thickness $E_2$ on the line Lb, a thickness $E_3$ on the line Lc, a thickness $E_4$ on the line Ld, and a thickness $E_5$ on the line Le are measured as shown in FIG. 17, and the average value for the thicknesses is regarded the thickness of second outer layer 132.

For example, in the calculation of the average thickness for a plurality of effective dielectric layers 133 of main electrostatic capacitance portion 10, the thickness is measured by the method mentioned above for each of five effective dielectric layers 133 in total: effective dielectric layer 133 located substantially in the center in a thickness direction T of main electrostatic capacitance portion 10; and two effective dielectric layers 133 located on each side, and the average value for the thickness is regarded as the average thickness for a plurality of effective dielectric layers 133 of main electrostatic capacitance portion 10.

It is to be noted that when the number of effective dielectric layers 133 stacked is less than 5, the thickness is measured by the method mentioned above for all of effective dielectric layers 133, and the average value for the thickness is regarded as an average thickness for a plurality of effective dielectric layers 133.

For example, in the measurement of the distance from second principal surface 112 to inner internal electrode 142x, a distance $L_1$ on the line La, a distance $L_2$ on the line Lb, a distance $L_3$ on the line Lc, a distance $L_4$ on the line Ld, and a distance $L_5$ on the line Le are measured as shown in FIG. 17, and the average value for the distances is regarded as the distance from second principal surface 112 to inner internal electrode 142x.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A laminated capacitor comprising:
a laminated body including dielectric layers and internal electrodes stacked in a stacking direction, and including a first principal surface and a second principal surface located opposite to each other in the stacking direction; and
a plurality of external electrodes provided partially on a surface of the laminated body and electrically connected to the internal electrodes; wherein
the laminated body includes:
   a first end surface and a second end surface opposed to each other, the first and second end surfaces connecting the first principal surface and the second principal surface;
   a first side surface and a second side surface opposed to each other, the first and second side surfaces connecting the first principal surface and the second principal surface and connecting the first end surface and the second end surface;
   a main electrostatic capacitance portion including an effective dielectric layer sandwiched between a pair of the internal electrodes, and stacked with the pair of the internal electrodes;
   one of the pair of internal electrodes is connected at the first side surface to one of the plurality of external electrodes;
   the other of the pair of internal electrodes is connected at the second side surface to another one of the plurality of external electrodes; and
   a first sub-electrostatic capacitance portion sandwiched between the main electrostatic capacitance portion and the second principal surface;
the first sub-electrostatic capacitance portion includes a plurality of ineffective dielectric layers each sandwiched between another respective pair of the internal electrodes connected to the same external electrode, at least one effective dielectric layer, and a plurality of the internal electrodes sandwiching each of the effective dielectric layers;
one of the plurality of ineffective dielectric layers among the plurality of ineffective dielectric layers is adjacent to the main electrostatic capacitance portion;
a number of the effective dielectric layers included in the main electrostatic capacitance portion is larger than a number of the effective dielectric layers included in the first sub-electrostatic capacitance portion;
the main electrostatic capacitance portion is thicker than the first sub-electrostatic capacitance portion;
the main electrostatic capacitance portion includes a center located farther away from the second principal surface than a center of the laminated body in the stacking direction;
the internal electrodes that are adjacent to, at a side of the second principal surface and a side of the first principal surface, the effective dielectric layer closest to the second principal surface in the first sub-electrostatic capacitance portion, are respectively defined as an outer internal electrode and an inner internal electrode;
a distance between the inner internal electrode and the second principal surface is smaller than or equal to a distance between the internal electrode closest to the second principal surface in the main electrostatic capacitance portion and the inner internal electrode;
a shortest distance between the external electrode connected to the inner internal electrode and the outer internal electrode is larger than a shortest distance between the outer internal electrode and the inner internal electrode;

a shortest distance between the first side surface and the second side surface is less than a shortest distance between the first end surface and the second end surface; and a thickness tb of the ineffective dielectric layer adjacent to the main electrostatic capacitance portion is larger than a thickness to of the effective dielectric layer of the main electrostatic capacitance portion such that tb>2ta.

2. The laminated capacitor according to claim 1, wherein an electrostatic capacitance of each of the effective dielectric layers included in the first sub-electrostatic capacitance portion is lower than an electrostatic capacitance of each of the effective dielectric layers included in the main electrostatic capacitance portion.

3. The laminated capacitor according to claim 1, wherein the laminated body includes an internal conductor located between the internal electrode adjacent to, at the first principal surface side, the effective dielectric layer located closest to the first principal surface and the first principal surface.

4. The laminated capacitor according to claim 1, wherein the first sub-electrostatic capacitance portion is a strain suppression portion configured to suppress strain in the laminated body, with the one ineffective dielectric layer located between the effective dielectric layer of the first sub-electrostatic capacitance portion and the main electrostatic capacitance portion.

5. The laminated capacitor according to claim 1, wherein
the laminated body includes a second sub-electrostatic capacitance portion sandwiched between the main electrostatic capacitance portion and the first principal surface;
the second sub-electrostatic capacitance portion includes a plurality of the other ineffective dielectric layers each sandwiched between a pair of internal electrodes connected to the same external electrode, and at least one of the effective dielectric layers; and
one of the other ineffective dielectric layers among the plurality of the other ineffective dielectric layers is adjacent to the main electrostatic capacitance portion.

6. The laminated capacitor according to claim 5, wherein
a number of the effective dielectric layers included in the main electrostatic capacitance portion is larger than a number of the effective dielectric layers included in the second sub-electrostatic capacitance portion; and
the main electrostatic capacitance portion is thicker than the second sub-electrostatic capacitance portion.

7. The laminated capacitor according to claim 5, wherein
when the internal electrodes that are adjacent to, at a side of the first principal surface and a side of the second principal surface, the effective dielectric layer closest to the first principal surface in the second sub-electrostatic capacitance portion are respectively defined as the other outer internal electrode and the other inner internal electrode;

a distance between the other inner internal electrode and the first principal surface is smaller than or equal to a distance between the internal electrode closest to the first principal surface in the main electrostatic capacitance portion and the other inner internal electrode.

8. The laminated capacitor according to claim 5, wherein
when the internal electrodes adjacent to, at a side of the first principal surface and a side of the second principal surface, the effective dielectric layer located closest to the first principal surface in the second sub-electrostatic capacitance portion are respectively defined as the other outer internal electrode and the other inner internal electrode;
a shortest distance between the external electrode connected to the other inner internal electrode and the other outer internal electrode is larger than a shortest distance between the other outer internal electrode and the other inner internal electrode.

9. The laminated capacitor according to claim 5, wherein an electrostatic capacitance of each of the effective dielectric layers included in the second sub-electrostatic capacitance portion is lower than an electrostatic capacitance of each of the effective dielectric layers included in the main electrostatic capacitance portion.

10. The laminated capacitor according to claim 5, wherein the laminated body includes an internal conductor located between the internal electrode adjacent to, at a side of the second principal surface, the effective dielectric layer located closest to the second principal surface and the second principal surface.

11. The laminated capacitor according to claim 5, wherein the second sub-electrostatic capacitance portion is a strain suppression portion configured to suppress strain in the laminated body, with the one other ineffective dielectric layer located between the effective dielectric layer of the second sub-electrostatic capacitance portion and the main electrostatic capacitance portion.

12. A laminated capacitor series comprising:
a plurality of the laminated capacitors according to claim 1;
a packing body including an elongated carrier tape provided with a plurality of recesses at intervals to respectively housing the plurality of laminated capacitors; and
a cover tape attached to the carrier tape to seal the plurality of recesses; wherein
the plurality of laminated capacitors are respectively housed in the plurality of recesses, with the second principal surfaces located at bottom sides of the plurality of recesses.

13. A laminated capacitor mounted body comprising:
the laminated capacitor according to claim 1; and
a mounting body mounted with the laminated capacitor; wherein
the second principal surface of the laminated capacitor is opposed to the mounting body.

* * * * *